United States Patent
Mizuhashi et al.

(10) Patent No.: US 8,466,886 B2
(45) Date of Patent: Jun. 18, 2013

(54) LIQUID-CRYSTAL DISPLAY PANEL AND CHOPPER-TYPE COMPARATOR

(75) Inventors: Hiroshi Mizuhashi, Kanagawa (JP); Yuko Yamauchi, Kanagawa (JP); Yoshiharu Nakajima, Kanagawa (JP); Tsutomu Tanaka, Kanagawa (JP); Shuji Hayashi, Kanagawa (JP); Takeo Koito, Kanagawa (JP); Masumitsu Ino, Kanagawa (JP)

(73) Assignee: Japan Display West, Inc., Aichi-ken (JP)

( * ) Notice: Subject to any disclaimer, the term of this patent is extended or adjusted under 35 U.S.C. 154(b) by 838 days.

(21) Appl. No.: 12/585,316

(22) Filed: Sep. 11, 2009

(65) Prior Publication Data

US 2010/0097340 A1 Apr. 22, 2010

(30) Foreign Application Priority Data

Oct. 20, 2008 (JP) ................................ 2008-269747

(51) Int. Cl.
*G06F 3/041* (2006.01)

(52) U.S. Cl.
USPC ......................................... 345/173; 327/124

(58) Field of Classification Search
USPC ......................................... 345/173; 327/124
See application file for complete search history.

(56) References Cited

U.S. PATENT DOCUMENTS

| 7,973,777 | B2 * | 7/2011 | Lee et al. ....................... 345/175 |
| 2004/0257257 | A1 * | 12/2004 | Nomasaki et al. ............. 341/172 |
| 2006/0220077 | A1 * | 10/2006 | Hayashi et al. ................ 257/291 |
| 2006/0262100 | A1 | 11/2006 | Van Berkel |

FOREIGN PATENT DOCUMENTS

| JP | 04-157915 A | 5/1992 |
| JP | 2006-244218 A | 9/2006 |
| JP | 2007-503640 | 2/2007 |

OTHER PUBLICATIONS

Japanese Office Action issued Aug. 31, 2010 for corresponding Japanese Application No. 2008-269747.

* cited by examiner

*Primary Examiner* — LaTanya Bibbins
(74) *Attorney, Agent, or Firm* — Rader, Fishman & Grauer PLLC

(57) ABSTRACT

A liquid-crystal display panel includes: gate lines each serving as a row-direction line which is one of the rows of a two-dimensional matrix; data signal lines each serving as a column-direction line which is one of the columns of the two-dimensional matrix; a plurality of liquid-crystal pixel sections which are laid out to form the two-dimensional matrix and each placed at the intersection of one of the gate lines and one of the data signal lines; chopper-type comparators each connected to one of the data signal lines and each used for converting the value of a sensor signal read out from one of the liquid-crystal pixel sections connected to the data signal lines into a binary value; and a shift register for converting outputs of the chopper-type comparators from parallel data into serial data and outputting the serial data.

14 Claims, 17 Drawing Sheets

RESET

COMPARISON

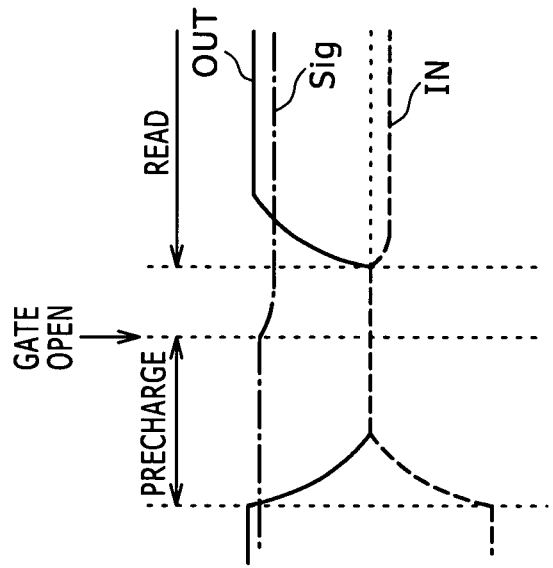
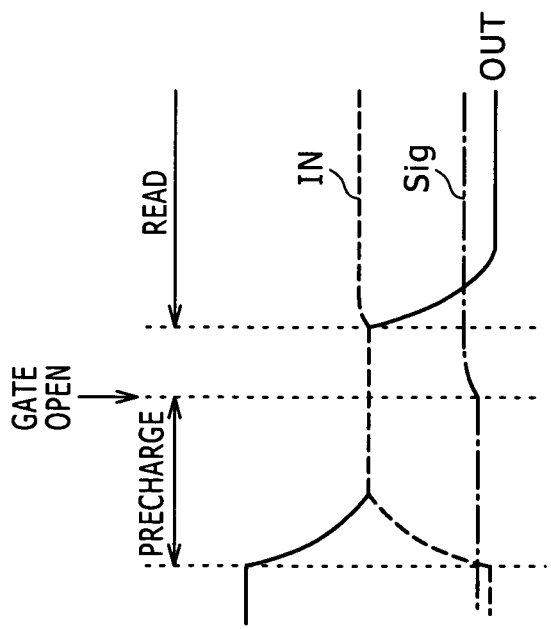

RESET

COMPARISON

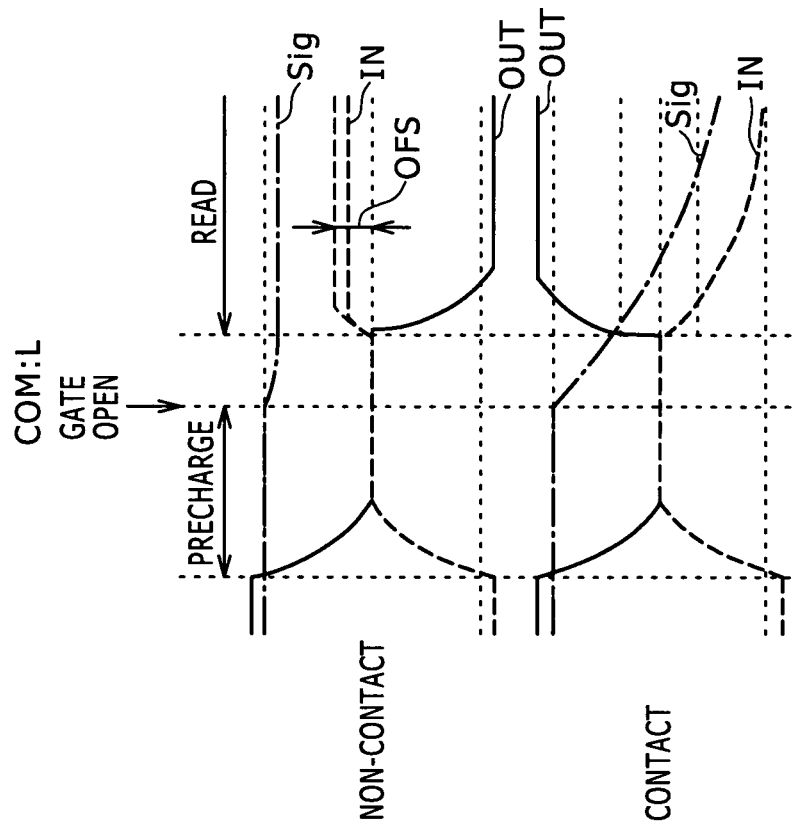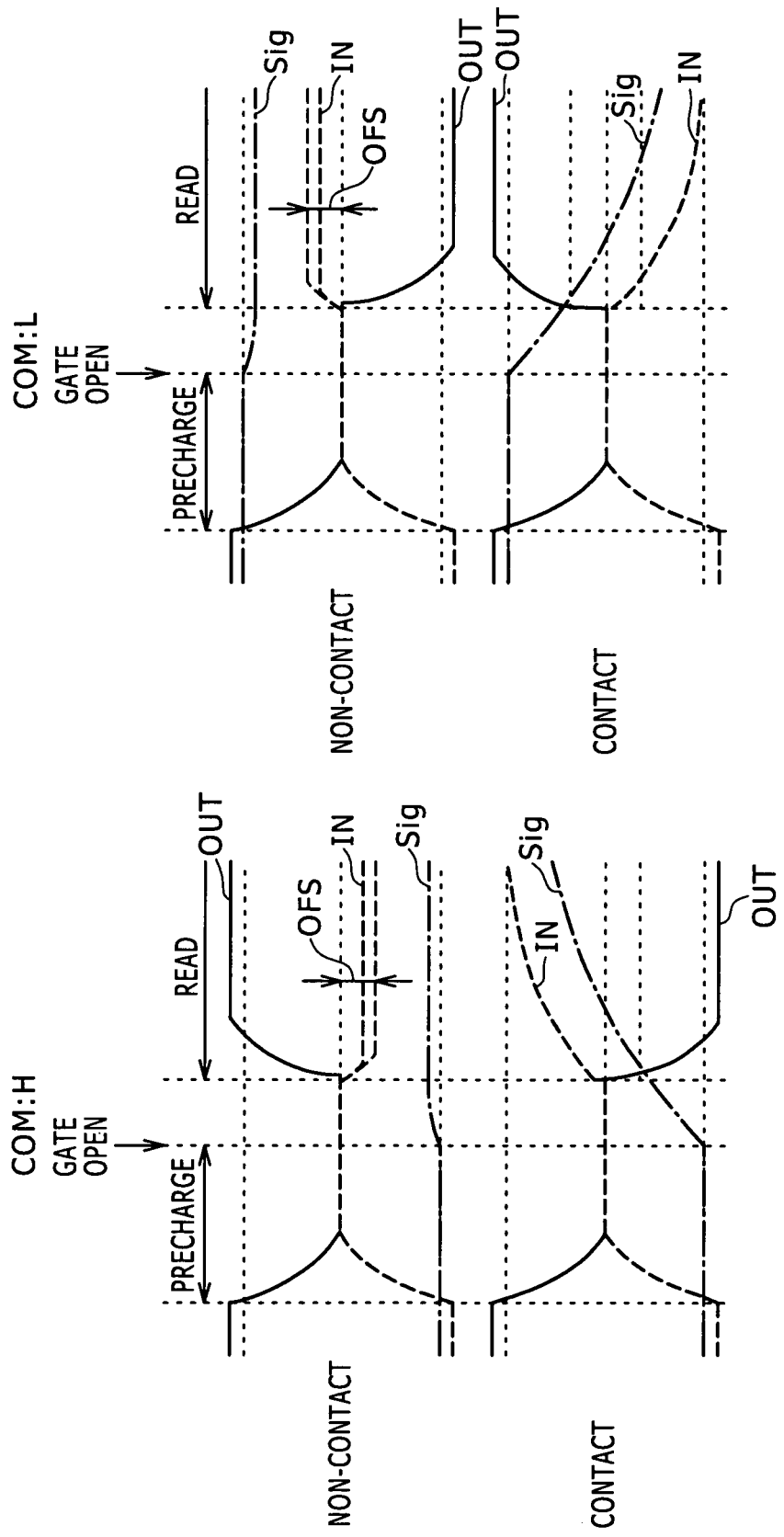

POWER SAVE

RESET

COMPARISON

LIQUID-CRYSTAL DISPLAY PANEL AND CHOPPER-TYPE COMPARATOR

BACKGROUND OF THE INVENTION

1. Field of the Invention

The present invention relates to a liquid-crystal display panel having a touch-sensor function and a chopper-type comparator which can be properly installed on such a liquid-crystal display panel.

2. Description of the Related Art

In recent years, there have been proposed a variety of display panels provided with a sensor function embedded in liquid display panels as a function which allows inputs to be entered to the display panels by the user through operations to touch the panels.

However, most of the proposed display panels adopt a method described as follows. The output of a touch sensor for implementing the sensor function is fetched to the outside of the display panel as an analog signal. The analog signal is then subjected to an A/D (analog/digital) conversion process which is carried out by an IC external to the display panel in order to convert the analog signal into a digital signal. Subsequently, the digital data is subjected to various kinds of data processing.

In this case, typically, a touch sensor is employed in each liquid-crystal pixel circuit included in the display panel. Thus, in order to detect information generated by each of the sensors, as many wires as the sensors need to be provided between the display panel and the external IC. As a result, the proposed display panels raise a problem that the frame of the display panel increases and the external IC becomes larger in size.

To put it more concretely, there has been proposed a method described in U.S. Published Application No. 2006/0262100 as a method of making use of an external IC for detecting the output of a touch sensor, which is employed in every liquid-crystal pixel circuit included in the display panel, through a signal line originally used for giving a display data signal to the pixel circuit.

FIG. 16 is an explanatory circuit diagram showing a typical configuration for implementing the method for detecting the output of a touch sensor which is also referred to as a pressure sensor in the following description. As shown in the circuit diagram of FIG. 16, the display panel is a pixel array 100 employing pixel circuits 101 which are laid out to form a two-dimensional matrix. The pixel array 100 also includes a number of data signal lines LS which are each oriented in the direction of the columns of the two-dimensional matrix. In addition, the pixel array 100 also includes a number of gate lines GL which are each oriented in the direction of the rows of the two-dimensional matrix. Each of the pixel circuits 101 is placed at the intersection of one of the data signal lines LS and one of the gate lines GL.

Each of the pixel circuits 101 has a liquid-crystal cell LC containing a liquid crystal provided between electrodes which face each other. To put it concretely, the liquid crystal is provided between a pixel electrode and a COM (common) electrode which is facing the pixel electrode.

In addition, the pixel circuit 101 also employs a pixel transistor Tr. The gate node of the pixel transistor Tr is connected to the gate line GL whereas the source node of the pixel transistor Tr is connected to the data signal line LS. The drain node of the pixel transistor Tr is connected to the pixel electrode of the liquid-crystal cell LC.

On top of that, the pixel circuit 101 also employs a pressure sensor S. The pressure sensor S has a structure for electrically connecting the pixel and COM electrodes to each other when an external pressure is applied to the pressure sensor S by a finger of the user.

Each of the data signal lines LS on the pixel array 100 is connected to an external IC 102. In the external IC 102, each of the data signal lines LS is connected to a circuit which includes an operational amplifier 121, an A/D converter 122, a switch 123 and a capacitor 124 as shown in the circuit diagram of FIG. 16.

The switch 123 is operated to change an operation to assert display data on the data signal line LS to an operation to read out information generated by the pressure sensor S from the data signal line LS and vice versa. To put it in detail, in a write operation to assert display data on the data signal line LS, the switch 123 is put in a turned-on state in order to assert the signal value of the display data on the data signal line LS. The signal value has been supplied to the switch 123 from a write circuit by way of the operational amplifier 121. The signal value asserted on the data signal line LS is written into the liquid-crystal cell LC of the pixel circuit 101 by way of the pixel transistor Tr which has been put in a turned-on state by the gate line GL. It is to be noted that the write circuit itself is not shown in the circuit diagram of FIG. 16.

In a read operation to read out information generated by the pressure sensor S from the data signal line LS, on the other hand, the switch 123 is put in a turned-off state in order to electrically disconnect the output of the operational amplifier 121 from the data signal line LS. In this state, information output by the pressure sensor S is amplified by the operational amplifier 121 and, then, an analog signal generated by the operational amplifier 121 is converted by the A/D converter 122 into a digital signal.

In contrast with the configuration described above, a technique for reducing the number of lines connecting the liquid-crystal display panel 100 to the external IC 102 is adopted by, for example, a small-size display panel for mobile apparatus or the like. FIG. 17 is a diagram showing a typical configuration of a display panel in which the number of lines connecting the liquid-crystal display panel 100 to the external IC 102 is reduced in order to decrease the size of the frame of the display panel 100 and the chip size of the external IC 102. In order to reduce the number of lines connecting the liquid-crystal display panel 100 to the external IC 102, the display panel adopts the so-called selector method in carrying out signal write operations. Such a display panel has been becoming popular.

In the typical configuration shown in the diagram of FIG. 17, a switch 103 associated with the B (blue) color, a switch 104 associated with the G (green) color and a switch 105 associated with the R (red) color are provided for every three data signal lines LS respectively. The three data signal lines LS are connected by the switches 103, 104 and 105 to a single data signal line LSrgb which is connected to the external IC 102.

To put it more concretely, the switch 103 associated with the B color is provided for a data signal line LS connected to a B (blue) pixel circuit 101. By the same token, the switch 104 associated with the G color is provided for a data signal line LS connected to a G (green) pixel circuit 101. In the same way, the switch 105 associated with the R color is provided for a data signal line LS connected to an R (red) pixel circuit 101.

In this case, for any B, G and R pixel circuits 101 connected to a gate line GL serving as a horizontal row of the two-dimensional matrix and connected to data signal lines LS each serving as a vertical column of the two-dimensional matrix, the B, G and R switches 103, 104 and 105 are put in a turned-on state on a time division basis during one horizontal period in order to store B, G and R signal values from the data signal lines LS into the B, G and R pixel circuits 101 respectively.

In such a configuration, the number of single data signal lines LSrgb each connecting the liquid-crystal display panel 100 to the external IC 102 through the switches 103, 104 and 105 each serving as a selector is smaller than the number of data signal lines LS. That is to say, the number of lines connecting the liquid-crystal display panel 100 to the external IC 102 can be reduced. In particular, the larger the number of selectors cited above, the larger the number of eliminated lines connecting the liquid-crystal display panel 100 to the external IC 102 and, thus, the larger the effect of the reduced number of such lines. As a result, the larger the number of selectors cited above, the greater the obtained cost merit.

However, the larger the number of selectors cited above, the shorter the write time. The write time is defined as the time during which a driver circuit embedded in the external IC 102 is connected to a data signal line LS in the pixel array 100.

By the same token, the larger the number of selectors, the shorter the read time. The read time is defined as time that it takes to carry out the read operation described earlier by referring to the circuit diagram of FIG. 16. Thus, if an attempt is made to share a data signal line LS among pieces of information read out from touch detection sensors S as described earlier by referring to the circuit diagram of FIG. 16, the read time becomes extremely short and the proposed method becomes virtually impractical.

SUMMARY OF THE INVENTION

As described above, it is known that, in a configuration including a touch detection sensor attached to each pixel circuit on the pixel array, the external IC reads out information, which is generated by the sensor, through the data signal line LS. In order to reduce the number of lines connecting the pixel array to the external IC, adoption of the selector method explained above by referring to the diagram of FIG. 17 is conceived. With the selector method, however, the read time allocated to an operation to read out information generated by the pressure sensor S becomes extremely short. Thus, the pixel array adopting the selector method is by no means a practical structure of a display panel which has a touch panel function.

In order to solve the problems described above, in accordance with the present invention, there is provided a liquid-crystal display panel which has few lines connecting the panel to the external IC and has a small frame but is yet capable of including a touch sensor function embedded in the panel.

A liquid-crystal display panel according to an embodiment of the present invention includes: gate lines each serving as a row-direction line which is one of the rows of a two-dimensional matrix; data signal lines each serving as a column-direction line which is one of the columns of the two-dimensional matrix; a plurality of liquid-crystal pixel sections which are laid out to form the two-dimensional matrix and each placed at the intersection of one of the gate lines and one of the data signal lines; chopper-type comparators each connected to one of the data signal lines and each used for converting the value of a sensor signal read out from one of the liquid-crystal pixel sections connected to the data signal lines into a binary value; and a shift register for converting outputs of the chopper-type comparators from parallel data into serial data and outputting the serial data.

In the liquid-crystal display panel, each individual one of the liquid-crystal pixel sections contains a liquid crystal provided between a pixel electrode and a facing electrode facing the pixel electrode; each individual liquid-crystal pixel section includes a pressure sensor for sensing an applied pressure by detecting whether the pixel electrode and the facing electrode are in a state of being brought into contact or non-contact with each other; and during a period in which the pixel electrode is in a state of being connected to the data signal line connected to the individual liquid-crystal pixel section by a control signal asserted on the gate line connected to the individual liquid-crystal pixel section, a liquid-crystal driving signal is supplied to the individual liquid-crystal pixel section through the data signal line, or the sensor signal indicating whether the pixel and facing electrodes are in a state of being brought into contact or non-contact with each other is read out from the individual liquid-crystal pixel section through the data signal line connected to the individual liquid-crystal pixel section.

The chopper-type comparator includes: a first capacitor with a specific node thereof selectively receiving the sensor signal or a first reset electric potential; a second capacitor with a specific node thereof selectively receiving the sensor signal or a second reset electric potential different from the first reset electric potential, the other node thereof connected to the other node of the first capacitor and the capacitance thereof different from the capacitance of the first capacitor; an inverter with the input thereof connected to the other nodes of the first and second capacitors; and a switch device for connecting the input of the inverter to the output of the inverter or disconnecting the input of the inverter from the output of the inverter.

The first reset electric potential is an electric potential having a phase opposite to the phase of an electric potential appearing at the facing electrode whereas the second reset electric potential is the electric potential appearing at the facing electrode.

When the chopper-type comparator is operating in a reset state, the switch device connects the input of the inverter to the output of the inverter, the first reset electric potential, which is a electric potential having a phase opposite to the phase of the electric potential appearing at the facing electrode, is supplied to the specific node of the first capacitor and the second reset electric potential, which is the electric potential appearing at the facing electrode, is supplied to the specific node of the second capacitor.

When the chopper-type comparator is operating in a comparison state, on the other hand, the switch device disconnects the input of the inverter from the output of the inverter and the sensor signal is supplied to the specific node of the first capacitor as well as the specific node of the second capacitor. Thus, in this comparison state, the chopper-type comparator outputs digital data having the binary value of the sensor signal to serve as the output of the inverter.

In addition, the chopper-type comparator has a configuration in which, when the chopper-type comparator is in a power-save state, each of the specific node of the first capacitor, the specific node of the second capacitor and the other nodes of the first and second capacitors is put in floating state before being pulled down or pulled up.

The chopper-type comparator according to another embodiment of the present invention includes: a first capacitor with a specific node thereof selectively receiving an input signal or a first reset electric potential; a second capacitor with a specific node thereof selectively receiving the input signal or a second reset electric potential different from the first reset electric potential, the other node thereof connected to the other node of the first capacitor and the capacitance thereof different from the capacitance of the first capacitor; an inverter with the input thereof connected to the other nodes of the first and second capacitors; and a switch device for connecting the input of the inverter to the output of the inverter or disconnecting the input of the inverter from the output of the inverter.

When the chopper-type comparator is operating in a reset state, the switch device connects the input of the inverter to the output of the inverter, the first reset electric potential is supplied to the specific node of the first capacitor and the second reset electric potential is supplied to the specific node of the second capacitor.

When the chopper-type comparator is operating in a comparison state, on the other hand, the switch device disconnects the input of the inverter from the output of the inverter and the input signal is supplied to the specific node of the first capacitor as well as the specific node of the second capacitor. Thus, in this comparison state, the chopper-type comparator outputs digital data having the binary value of the input signal to serve as the output of the inverter.

In the liquid-crystal display panel according to the embodiment of the present invention, first of all, information generated as a sensor signal by the pressure sensor included in each liquid-crystal pixel section is read out through the data signal line connected to the pixel section. Since the data signal line is connected to the chopper-type comparator also employed in the liquid-crystal display panel, the sensor signal output by the pressure sensor is converted by the comparator into digital data in the panel.

Then, in the same read operation, the shift register in the liquid-crystal display panel is capable of converting signals output by the pressure sensors for one horizontal line from parallel data into serial data and supplying the serial data to a recipient external to the liquid-crystal display panel.

In addition, since the read operation is carried out by the chopper-type comparators and the shift register which are both employed in the liquid-crystal display panel, a selector method allows the number of data signal lines to be reduced to the number of single data signal lines to connect the liquid-crystal display panel to the recipient external to the liquid-crystal display panel.

In the configuration described above, the sensor signal indicating whether the pixel and facing electrodes are in a state of being brought into contact or non-contact with each other is read out as sensor information from an individual liquid-crystal pixel section through the data signal line connected to the individual liquid-crystal pixel section. The sensor information is supplied through the data signal line to a chopper-type comparator which then converts the sensor information into a binary value by detecting whether the electric potential appearing on the data signal line has changed or is sustained as it is. If the chopper-type comparator is an ordinary chopper-type comparator which has a good response characteristic of responding to an increase or decrease of the electric potential appearing on the data signal line, the operation to detect a change of the electric potential produces an incorrect detection result in many cases. Since the chopper-type comparator according to the above-mentioned embodiment of the present invention is configured to convert the sensor information into a binary value, however, an incorrect detection result of the operation to detect a change of the electric potential appearing on the data signal line can be avoided, making it possible to carry out the operation in a stable manner.

In accordance with the present invention, the number of lines connecting components inside the liquid-crystal display panel to components external to the liquid-crystal display panel can be decreased. Thus, the size of the frame of the liquid-crystal display panel can also be reduced as well.

In addition, the chopper-type comparator according to the above-mentioned embodiment of the present invention is chopper-type comparator exhibiting a high-speed response characteristic for a case in which the pixel and facing electrodes of the pressure sensor are in a state of being brought into contact with each other and a stable operating characteristic for a case in which the pixel and facing electrodes of the pressure sensor are in a state of being brought into non-contact with each other. Thus, the function to detect an operation carried out on a touch panel of the liquid-crystal display panel can be carried out properly.

BRIEF DESCRIPTION OF THE DRAWINGS

FIGS. 5A and 5B are a plurality of explanatory diagrams each referred to in description of an incorrect operation of a chopper-type comparator according to the embodiment;

FIGS. 8A and 8B are a plurality of explanatory diagrams to be referred to in description of operations carried out by the chopper-type comparator according to the embodiment;

DETAILED DESCRIPTION OF THE PREFERRED EMBODIMENT

A preferred embodiment of the present invention is explained in chapters which are arranged in the following order:

[1. Basic Configuration of a Liquid-Crystal Display Panel According to an Embodiment]
[2. Ordinary Comparator for Reading Out Sensor Information]
[3. Configuration and Operations of a Comparator According to an Embodiment]
[4. First Typical Concrete Configuration of a Liquid-Crystal Display Panel According to the Embodiment]
[5. Second Typical Concrete Configuration of the Liquid-Crystal Display Panel According to the Embodiment]
[6. Other Typical Configuration of the Comparator According to the Embodiment]
[7. Effects of the Embodiment]
[1. Basic Configuration of a Liquid-Crystal Display Panel an Embodiment]

Figure 1:
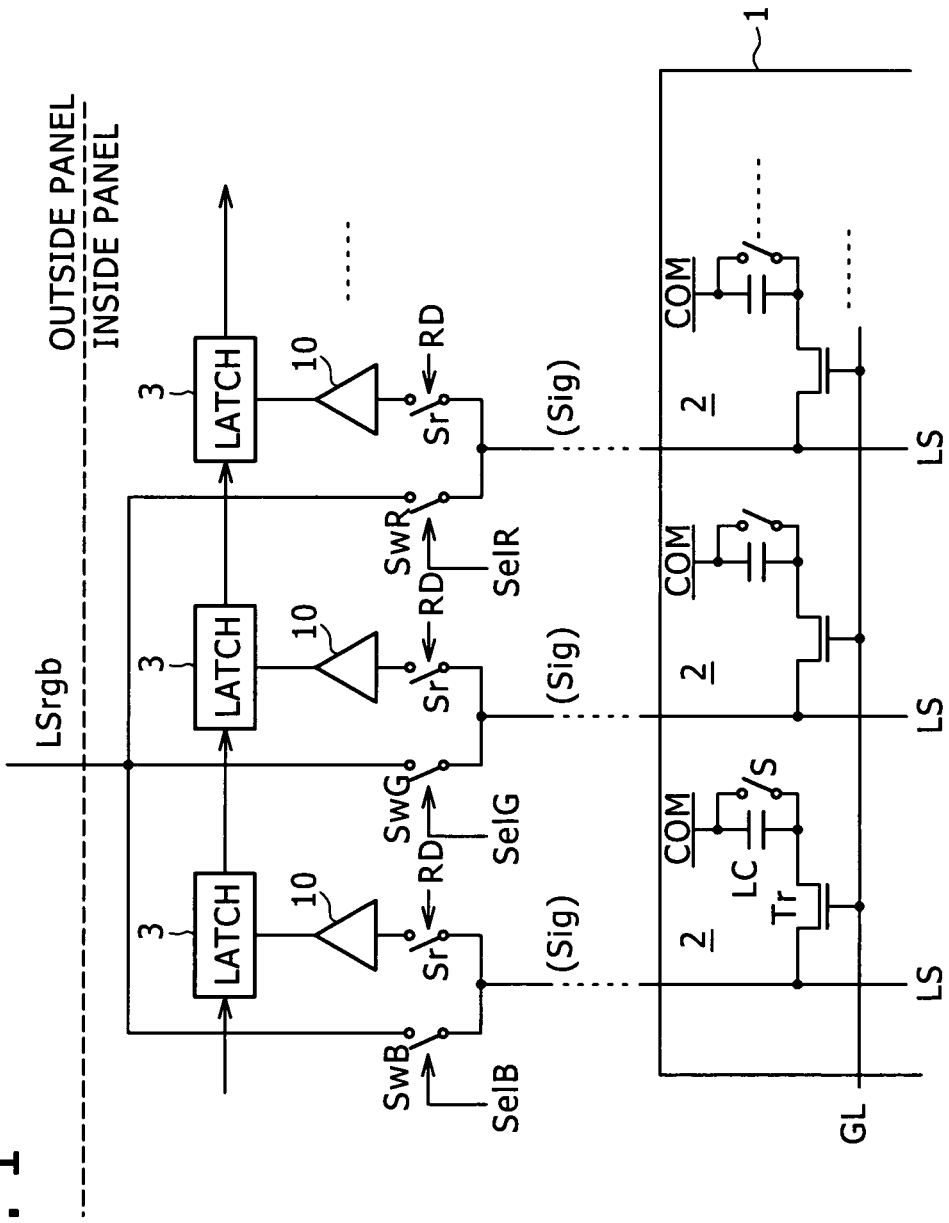
FIG. 1 is an explanatory circuit diagram to be referred to in description of the basic configuration of a liquid-crystal display panel according to an embodiment of the present invention.

FIG. 1 is an explanatory circuit diagram referred to in description of the basic configuration of a liquid-crystal display panel according to an embodiment of the present invention. It is to be noted that the complete configuration of the liquid-crystal display panel will be explained later by referring to other figures including FIG. 9.

The liquid-crystal display panel according to the embodiment includes a pixel array 1 having a plurality of pixel circuits 2 which are laid out to form a two-dimensional matrix.

FIG. 1 shows only a portion of the liquid-crystal display panel. The pixel array 1 is provided with a number of data signal lines LS which are each oriented in the column direction to serve as one of the columns of the two-dimensional matrix. By the same token, the pixel array 1 is also provided with a number of gate lines GL which are each oriented in the row direction to serve as one of the rows of the two-dimensional matrix. Each of the pixel circuits 2 is placed at the intersection of one of the data signal lines LS and one of the gate lines GL.

Each of the pixel circuits 2 has a liquid-crystal cell LC containing a liquid crystal provided between electrodes which face each other. To put it concretely, the liquid crystal is provided between a pixel electrode and a COM (common) electrode which is facing the pixel electrode.

In addition, the pixel circuit 2 also employs a pixel transistor Tr. The gate node of the pixel transistor Tr is connected to the gate line GL whereas the source node of the pixel transistor Tr is connected to the data signal line LS. The drain node of the pixel transistor Tr is connected to the pixel electrode of the liquid-crystal cell LC.

On top of that, the pixel circuit 2 also employs a pressure sensor S. The pressure sensor S has a structure for electrically connecting the pixel and COM electrodes to each other. The pressure sensor S electrically connects the pixel and COM electrodes to each other when a glass substrate, on which the liquid-crystal cell LC is provided, is deformed by an external pressure of a finger of the user.

Figure 17:
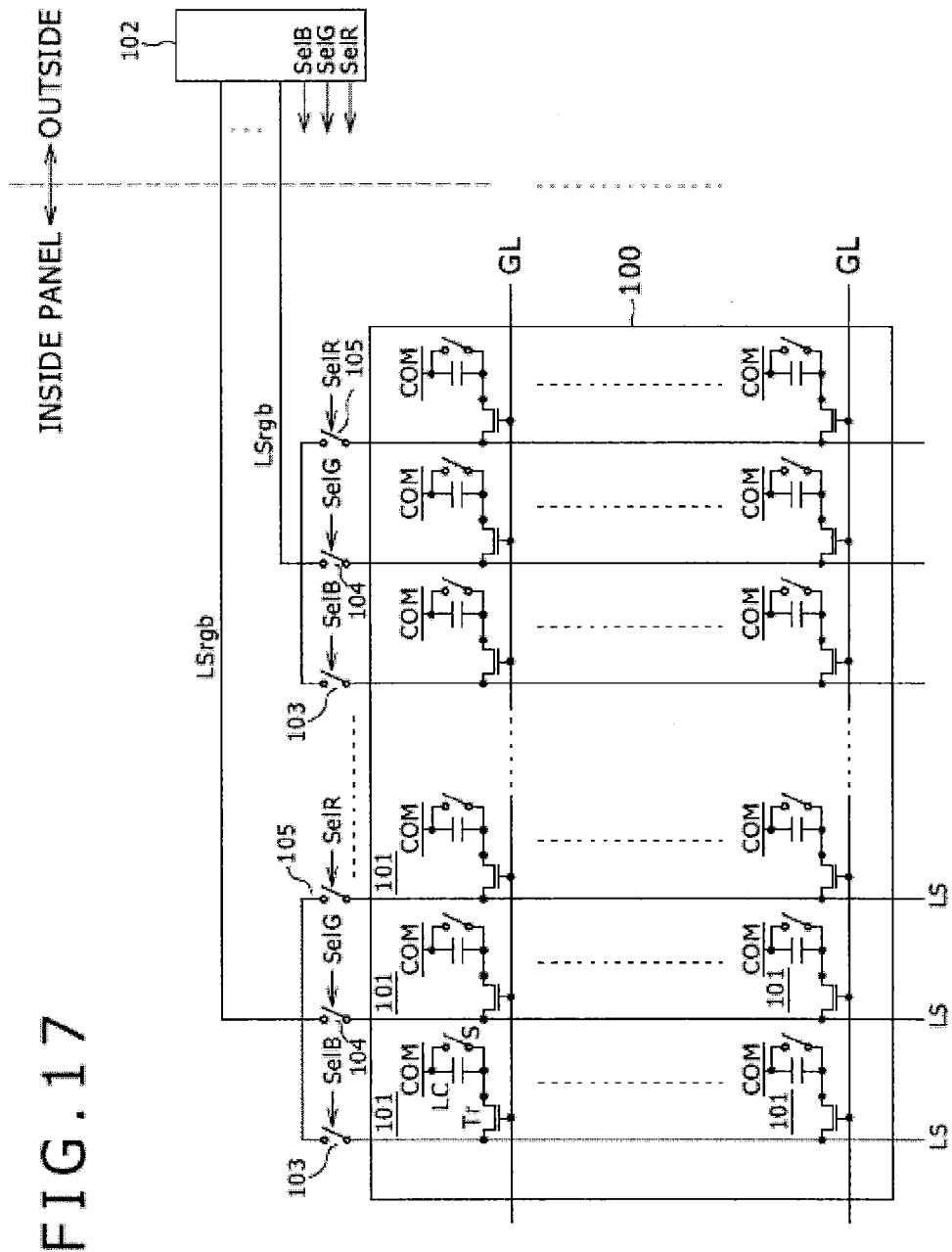
FIG. 17 is an explanatory circuit diagram showing a typical configuration of the related art liquid-crystal display panel which adopts a selector method.

Each of the data signal lines LS connects the pixel array 1 to an external circuit not shown in the circuit diagram of FIG. 1. In this case, the configuration of the selector method explained earlier by referring to the diagram of FIG. 17 is adopted. In this configuration, a switch employed in a selector is provided for every three data signal lines LS associated with the B (blue), G (green) and R (red) colors respectively. The selector serves as a set which treats the three data signal lines LS as a set. To put it more concretely, the selector includes write switches SwB, SwG and SwR for the B, G and R colors respectively. The write switches SwB, SwG and SwR connect the three data signal lines LS associated with the B, G and R colors respectively to the aforementioned single data signal line LSrgb which is connected to the external circuit.

The data signal line LS associated with the B-color write switch SwB is connected to a pixel circuit 2 provided for the B color. By the same token, the data signal line LS associated with the G-color write switch SwG is connected to a pixel circuit 2 provided for the G color. In the same way, the data signal line LS associated with the R-color write switch SwR is connected to a pixel circuit 2 provided for the R color.

In this case, for any B, G and R pixel circuits 2 connected to a gate line GL serving as a horizontal row of the two-dimensional matrix and connected to data signal lines LS each serving as a vertical column of the two-dimensional matrix, the write switches SwB, SwG and SwR for the B, G and R colors respectively are put in a turned-on state on a time division basis during one horizontal period in order to store B, G and R signal values from the external circuit through the data signal lines LS into the B, G and R pixel circuits 2 respectively.

As described previously by referring to the diagram of FIG. 17, the configuration of the selector method allows the number of lines connecting the liquid-crystal display panel to the external circuit to be reduced. In this case, however, an operation to read out information generated by a pressure sensor S employed in every pixel circuit 2 becomes complicated.

For this reason, it is necessary to separately provide a line for reading out information generated by a pressure sensor S employed in every pixel circuit 2. With such lines each provided to serve as a line for reading out information generated by a pressure sensor S employed in every pixel circuit 2, however, the number of lines connecting the liquid-crystal display panel to the recipient external to the liquid-crystal display panel increases, inevitably nullifying the merit of the selector method. Naturally, the increased number of lines connecting the liquid-crystal display panel to the recipient external to the liquid-crystal display panel also makes it difficult to reduce the size of the frame of the liquid-crystal display panel.

In order to solve the problem described above, there is provided means for converting the analog signal output by the pressure sensor S into digital data inside the liquid-crystal display panel. If such means such as a comparator 10 shown in the circuit diagram of FIG. 1 is provided, digital processing such as a parallel-to-serial conversion process can be carried out inside the liquid-crystal display panel. It is thus possible to prevent the number of lines connecting the liquid-crystal display panel to the recipient external to the liquid-crystal display panel from increasing due to the adoption of the function to read out information generated by a pressure sensor S which is employed in every pixel circuit 2.

The comparators 10 and the shift register which are shown in the circuit diagram of FIG. 1 are implemented in the configuration of the embodiment as follows. A data signal line LS connected to every pixel circuit 2 is provided with a read switch Sr for connecting the data signal line LS to the comparator 10.

The pressure sensor S provided in every pixel circuit 2 has a structure for detecting whether the pixel and COM electrodes of the liquid-crystal cell LC of the pixel circuit 2 are in a state of being brought into contact or non-contact with each other. Information generated by the pressure sensor S is a sensor signal indicating whether the pixel and COM electrodes of the liquid-crystal cell LC of the pixel circuit 2 are in a state of being brought into contact or non-contact with each other. This information generated by the pressure sensor S appears as a change of an electric potential appearing on the data signal line LS and is supplied to the comparator 10 associated with the pixel circuit 2. The comparator 10 then converts the information generated by the pressure sensor S into a digital signal representing a binary value of the information. Subsequently, the shift register having a plurality of latch circuits 3 in the liquid-crystal display panel converts the digital signals output by the comparators 10 for one horizontal line from parallel data into serial data and supplies the serial data to a recipient external to the liquid-crystal display panel. In this invention specification, the information generated by the pressure sensor S is also referred to simply as sensor information.

Figure 2:
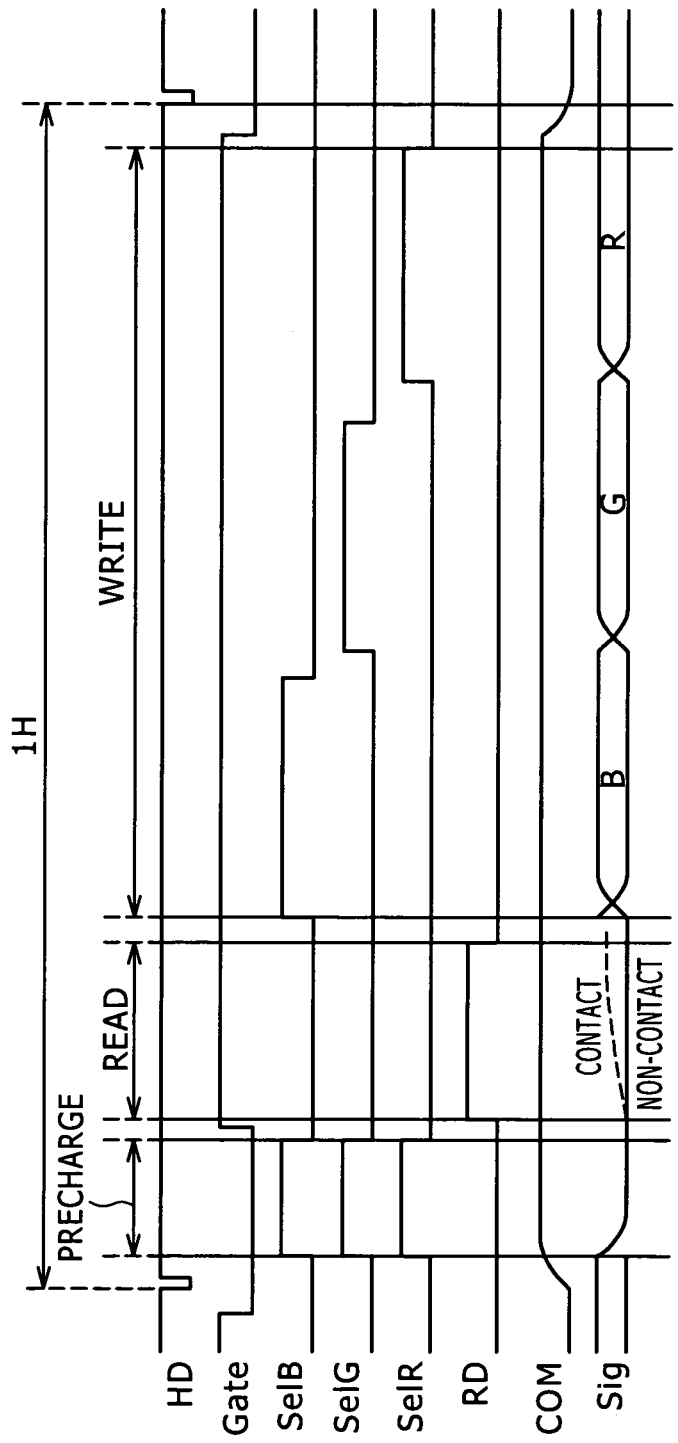
FIG. 2 is a timing diagram showing timing charts of operations carried out by the liquid-crystal display panel according to the embodiment.

FIG. 2 is a timing diagram showing timing charts of operations carried out by the liquid-crystal display panel. In actuality, the timing diagram of FIG. 2 shows the waveform of each of signals appearing in one horizontal period which is defined by horizontal sync pulses HD. The signals appearing in one horizontal period include the horizontal sync pulse HD, a gate-electrode pulse Gate, write signals SelB, SelG and SelR as well as a sensor read signal RD. The gate-electrode pulse Gate is generated by a gate driving circuit not shown and asserted on the gate line GL. The write signals SelB, SelG and SelR associated with the B, G and R colors respectively are signals for putting the write switches SwB, SwG and SwR respectively in a turned-on or turned-off state on a time division basis. The sensor read signal RD is a signal for putting all read switches Sr in a turned-on or turned-off state.

In addition, the signals appearing in one horizontal period also include an electric potential appearing on the COM electrode of the sensor S and an electric potential Sig appearing on the data signal line LS. In the following description, the electric potential appearing on the COM electrode of the sensor S is also referred to as a COM-electrode electric potential.

The write signals SelB, SelG and SelR as well as the sensor read signal RD are generated by a control circuit not shown and put the write switches SwB, SwG and SwR as well as all the read switches Sr respectively in a turned-on state with timings determined in advance in one horizontal period.

As basic operation timings, first of all, the electric potential appearing at the COM electrode is inverted and the low-level horizontal sync pulse HD is generated. The inversion of the electric potential appearing at the COM electrode is referred to as the so-called 1H inversion which is normally carried out to drive the liquid-crystal cell LC. A timing chart shown in the timing diagram of FIG. 2 to serve as the timing chart for the horizontal sync pulse HD indicates that the electric potential appearing at the COM electrode is inverted by changing the electric potential from an L (Low) level to an H (High) level.

Then, the write signals SelB, SelG and SelR are all raised from the L level to the H level in order to put all the write switches SwB, SwG and SwR in a turned-on state during a precharge period. With the write switches SwB, SwG and SwR each put in a turned-on state, all the data signal lines LS are precharged to an electric potential xCOM which has a phase opposite to that of the electric potential appearing at the COM electrode.

Subsequently, the write signals SelB, SelG and SelR are all lowered from the H level to the L level in order to put all the write switches SwB, SwG and SwR in a turned-off state and terminate the precharge period.

Then, the gate-electrode pulse Gate appearing on a gate line GL is changed from the L level to the H level in order to put the pixel transistor Tr employed in each of the pixel circuits 2 connected to the gate line GL in a turned-on state. Thus, the pixel electrode of the pixel circuit 2 including the pixel transistor Tr is connected to the data signal line LS provided for the pixel circuit 2.

Subsequently, the sensor read signal RD is changed from the L level to the H level in order to put all the read switches Sr in a turned-on state during a read period. In this case, information generated by a pressure sensor S employed in a pixel circuit 2 connected to a gate line GL serving as a horizontal-direction row of the two-dimensional matrix is supplied to the comparator 10 connected to the pixel circuit 2. The pixel transistor Tr employed in the pixel circuit 2 is supposed to be turned on by the gate-electrode pulse Gate appearing on the gate line GL as described above. As explained before, the information generated by a pressure sensor S is a sensor signal indicating whether the pixel and COM electrodes of the liquid-crystal cell LC of the pixel circuit 2 are in a state of being brought into contact or non-contact with each other.

For example, the COM and pixel electrodes of the liquid-crystal cell LC employed in a pixel circuit 2 not receiving a pressure from an external pressure source outside the liquid-crystal display panel are in a state of being brought into electrical non-contact with each other, that is, the pressure sensor S employed in the pixel circuit 2 is in a turned-off state. In this case, information is supplied from the pressure sensor S to the comparator 10 through the data signal line LS to indicate that the COM and pixel electrodes of the liquid-crystal cell LC are in a state of being brought into electrical non-contact with each other. To put it more concretely, the sensor signal Sig appearing on the data signal line LS as indicated by the bottom timing chart of the timing diagram of FIG. 2 is supplied to the comparator 10 as an electric potential not changing from the precharge level shown by a solid line of the timing chart.

On the other hand, the COM and pixel electrodes of the liquid-crystal cell LC employed in a pixel circuit 2 receiving a pressure from an external pressure source outside the liquid-crystal display panel are in a state of being brought into electrical contact with each other, that is, the pressure sensor S employed in the pixel circuit 2 is in a turned-on state. In this state, information is supplied from the pressure sensor S to the comparator 10 through the data signal line LS to indicate that the COM and pixel electrodes of the liquid-crystal cell LC are in a state of being brought into electrical contact with each other. To put it more concretely, the sensor signal Sig appearing on the data signal line LS as indicated by the bottom timing chart of the timing diagram of FIG. 2 is supplied to the comparator 10 as an electric potential gradually rising from the precharge level as shown by a dashed line of the timing chart.

In the read period during which the sensor read signal RD is sustained at the H level, the comparator 10 converts the information received from the pressure sensor S into digital data represented by a binary value of 1 or 0. As explained above, the information is received by the comparator 10 from the pressure sensor S as a change (or no change) of the level of the electric potential Sig appearing on the LS to indicate whether the pixel and COM electrodes of the liquid-crystal cell LC of the pixel circuit 2 are in a state of being brought into contact or non-contact with each other.

During the read period within one horizontal period, the comparators 10 convert the information generated by the pressure sensor S into digital data for each pixel circuit 2 on a horizontal-direction row of the two-dimensional matrix and supply the digital data as parallel data to the latch circuits 3 which are employed in a shift register. Then, the shift register converts the parallel data supplied to the latch circuits 3 into serial data, and supplies the serial data to a recipient external to the liquid-crystal display panel.

Thus, the comparators 10 and the latch circuits 3 read out sensor information from each pixel circuit 2 on a horizontal-direction row of the two-dimensional matrix for every horizontal period so that, in one frame period, the sensor information read out from all the pixel circuits 2 of the liquid-crystal display panel can be supplied to the recipient external to the liquid-crystal display panel as serial data through a single read line.

On the basis of the sensor information read out from all the pixel circuits 2 of the liquid-crystal display panel, the recipient external to the liquid-crystal display panel determines a touched position on the display screen.

Then, the sensor read signal RD is changed from the H level to the L level in order to end the read period included in the horizontal period allocated to an operation to read out information from the pressure sensors S. The read period is followed by a write period during which the value of a signal appearing on each data signal line LS is stored in the pixel circuit 2 connected to the data signal line LS.

In the write period, the write signals SelB, SelG and SelR are raised from the L level to the H level sequentially in order to put the write switches SwB, SwG and SwR in a turned-on state on a one-after-another basis. With the write switch SwB put in a turned-on state, the value of a B (blue) signal appearing on the single data signal line LSrgb connected to an external circuit is stored in the pixel circuit 2 provided for the B color. By the same token, with the write switch SwG put in a turned-on state, the value of a G (green) signal appearing on the single data signal line LSrgb connected to the external circuit is stored in the pixel circuit 2 provided for the G color. In the same way, with the write switch SwR put in a turned-on state, the value of an R (red) signal appearing on the single data signal line LSrgb connected to the external circuit is stored in the pixel circuit 2 provided for the R color.

Basically, the embodiment has the configuration described above and carries out the operations explained so far. Since the number of single data signal lines LSrgb is smaller than the number of data signal lines LS, the number of lines connecting components inside the liquid-crystal display panel to those outside the liquid-crystal display panel can be reduced. In addition, by properly reading out information from the pressure sensor S employed in every pixel circuit 2, it is possible to accurately detect inputs entered by the user by operating a touch panel.

[2. Ordinary Comparator for Reading Out Sensor Information]

This chapter explains a case in which an ordinary chopper-type comparator is used as the comparator 10 employed in the liquid-crystal display panel shown in the diagram of FIG. 1.

In order to implement the sensor-information reading system described above, a high-speed response is required in a sensor contact state but, in a sensor non-contact state, it is necessary to avoid a malfunction which is caused by effects of a noise and the like.

Since the chopper-type comparator 10 employs a small number of components, the comparator is capable of getting rid of effects which are caused by temperature variations and transistor-characteristic variations. For this reason, the chopper-type comparator 10 is used in a variety of systems.

Figure 3A:
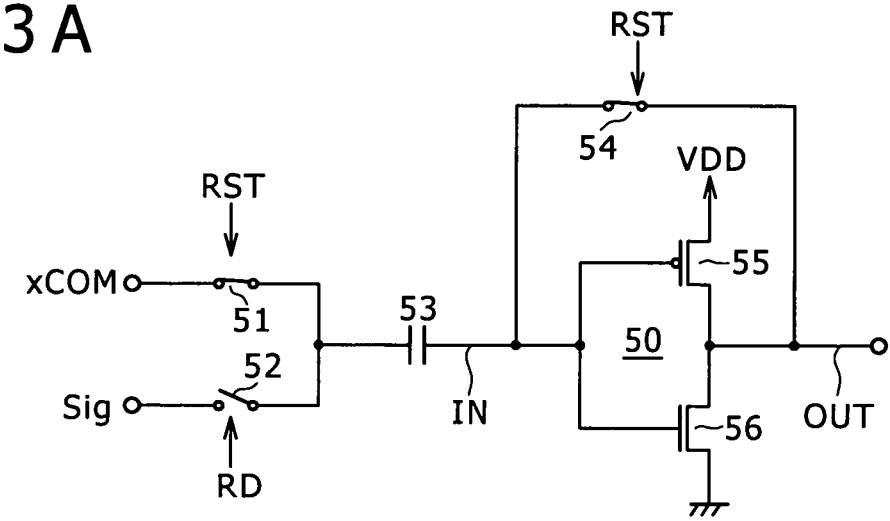
FIGS. 3A and 3B are a plurality of circuit diagrams each showing the circuit of an ordinary chopper-type comparator.
Figure 3B:
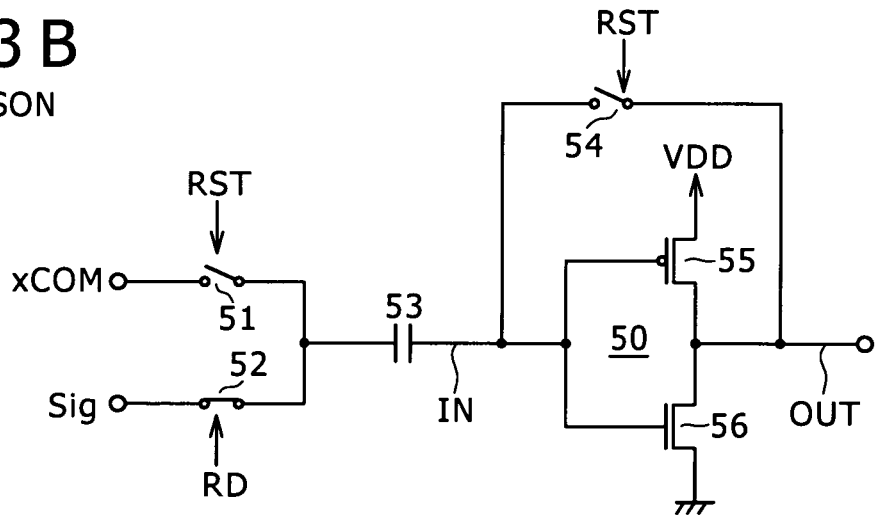

FIGS. 3A and 3B are a plurality of circuit diagrams each showing the circuit of an ordinary chopper-type comparator and circuit signal connections applied to the embodiment.

To be more specific, FIG. 3A is a circuit diagram showing the ordinary chopper-type comparator which is operating in a reset state. As shown in the circuit diagram of FIG. 3A, the ordinary chopper-type comparator employs switches 51, 52 and 54, a capacitor 53 as well as an inverter 50 which includes a P-channel FET (Field Effect Transistor) 55 and an N-channel FET 56.

With the switch 51 put in a turned-on state, an electric potential xCOM having a phase opposite to the phase of the electric potential appearing at the COM electrode is supplied to a specific node of the capacitor 53. The switch 51 is driven to enter a turned-on or turned-off state by a reset signal RST generated by a control circuit which is not shown in the circuit diagram of FIG. 3A.

With the switch 52 put in a turned-on state, on the other hand, an electric potential Sig appearing on the data signal line LS is supplied to the specific node of the capacitor 53. The switch 52 is driven to enter a turned-on or turned-off state by a sensor read signal RD generated by a control circuit which is not shown in the circuit diagram of FIG. 3A. It is to be noted that the switch 52 corresponds to the read switch Sr shown in the circuit diagram of FIG. 1.

The other node IN of the capacitor 53 is connected to the input of the inverter 50. As shown in the circuit diagram of FIG. 3A, the input IN of the inverter 50 is the gate nodes of the P-channel FET 55 and the N-channel FET 56.

In addition, the switch 54 is also driven to enter a turned-on or turned-off state by the reset signal RST. With the switch 54 put in a turned-on state, the input of the inverter 50 is connected to the output thereof.

Also as explained above, the reset signal RST puts the switch 51 in a turned-on state in order to put the chopper-type comparator in a reset state as shown in the circuit diagram of FIG. 3A. In this reset state, the inverted COM-electrode electric potential xCOM at the precharge level is being supplied to the specific node of the capacitor 53.

At the same time, the switch 54 is also put in a turned-on state as well, connecting the input of the inverter 50 to the output thereof. With the input of the inverter 50 connected to the output thereof, the input of the inverter 50 is set at a level close to the threshold voltage of the inverter 50.

As opposed to FIG. 3A which is a circuit diagram showing the ordinary chopper-type comparator operating in a reset state, FIG. 3B is a circuit diagram showing the ordinary chopper-type comparator which is operating in a comparison state of converting the electric potential Sig appearing on the data signal line LS into a binary value of digital data in the read period mentioned before in the description with reference to the timing diagram of FIG. 2.

When a comparison process is carried out during the read period shown in the timing diagram of FIG. 2, the switches 51 and 54 are sustained in a turned-off state as shown in the circuit diagram of FIG. 3B. On the other hand, the switch 52 is sustained in a turned-on state by the sensor read signal RD. With the switch 52 sustained in a turned-on state, the specific node of the capacitor 53 is connected to the data signal line LS. Thus, the electric potential appearing at the specific node of the capacitor 53 changes from the inverted COM-electrode electric potential xCOM to the sensor signal Sig which is appearing at the output node of the pressure sensor S.

When the electric potential appearing at the specific node of the capacitor 53 is changing from the inverted COM-electrode electric potential xCOM to the sensor signal Sig, typically, the inverted COM-electrode electric potential xCOM has been set at the L level and the data signal line LS has also been precharged to the L level as shown in the timing diagram of FIG. 2.

If the pressure sensor S is put in a turned-on state corresponding to a contact state, the sensor signal Sig appearing on the data signal line LS rises from the L precharge level to the level of the COM electrode as shown by the dashed line of the bottom timing chart of the timing diagram of FIG. 2.

If the pressure sensor S is put in a turned-off state corresponding to a non-contact state, on the other hand, the sensor signal Sig appearing on the data signal line LS remains at the L precharge level as it is as shown by the solid line of the bottom timing chart of the timing diagram of FIG. 2.

Figure 4A:
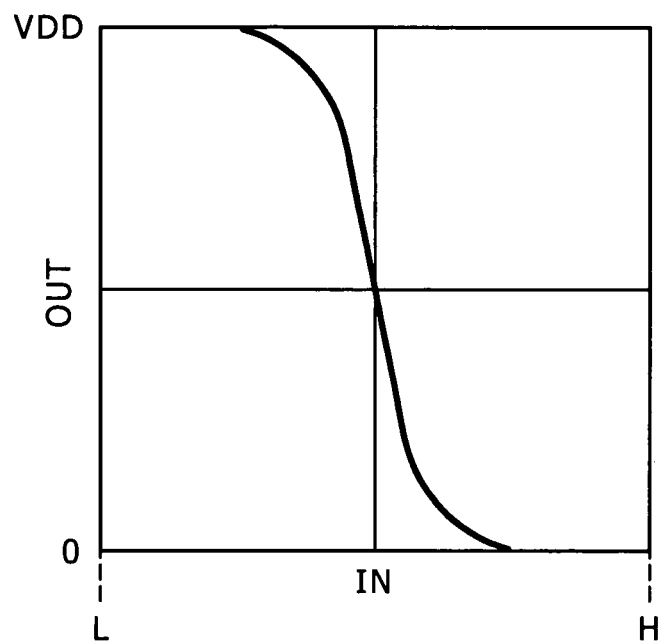
FIGS. 4A and 4B are a plurality of diagrams each showing an input-output characteristic of the chopper-type comparator shown in FIGS. 3A and 3B.
Figure 4B:
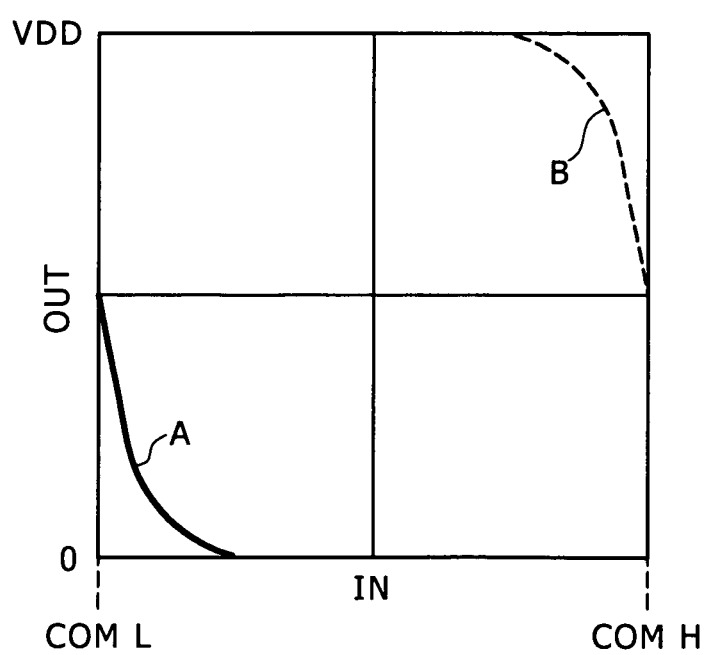

FIGS. 4A and 4B are a plurality of diagrams each showing an input-output characteristic. To be more specific, FIG. 4A is a diagram showing the input-output characteristic of an ordinary chopper-type comparator serving as an ordinary inverter whereas FIG. 4B is a diagram showing the characteristics of the input node IN and output node OUT of the inverter 50 employed in the chopper-type comparator shown in the diagrams of FIGS. 3A and 3B.

As described above, in the case of an inverted COM-electrode electric potential xCOM set at the L level, that is, in the case of a COM-electrode electric potential COM set at the H level, if the pressure sensor S is put in a turned-on state, the sensor signal Sig increases from the precharge level, which is the L level, to the COM-electrode level which is the H level.

As shown by a solid line A in the diagram of FIG. 4B, an infinitesimal electric-potential increase of the level of the sensor signal Sig serving as the input represented by the horizontal axis inverts the output level represented by the vertical axis. That is to say, the response is faster than the response exhibited by the ordinary inverter as shown in FIG. 4A.

In the case of an inverted COM-electrode electric potential xCOM set at the H level, that is, in the case of a COM-electrode electric potential COM set at the L level, on the other hand, if the pressure sensor S is put in a turned-on state, the sensor signal Sig drops from the precharge level, which is the H level, to the COM-electrode level which is the L level.

In this case, as shown by a dashed line B in the diagram of FIG. 4B, even an infinitesimal electric-potential decrease of the level of the sensor signal Sig serving as the input represented by the horizontal axis is capable of inverting the output level represented by the vertical axis. That is to say, the response is fast.

As described above, the chopper-type comparator is a circuit for reading out an infinitesimal change of an input signal in a plus or minus direction from a reference voltage of the input signal and amplifying the change. Thus, the chopper-type comparator has a high sensing speed.

If the input has a floating state, that is, a state of bringing the COM and pixel electrodes into non-contact with each other, as is the case with the present read system, however, a correct operation cannot be assured. This problem is explained by referring to diagrams of FIGS. 5A and 5B as follows.

FIGS. 5A and 5B are a plurality of explanatory diagrams each referred to in description of an incorrect operation. To be more specific, FIG. 5A is an explanatory diagram referred to in description of an incorrect operation which occurs for COM-electrode electric potential COM=H whereas FIG. 5B is an explanatory diagram referred to in description of an incorrect operation which occurs for COM-electrode electric potential COM=L. In each of the diagrams, a solid line represents an electric potential appearing at the output node OUT of the inverter 50, a dashed line represents an electric potential appearing at the input node IN of the inverter 50 and a dotted line represents the sensor signal Sig.

In a precharge period, the chopper-type comparator is in the reset state shown in the circuit diagram of FIG. 3A. In this reset state, the input of the inverter 50 is connected to the output thereof, setting the input and the output at the same electric potential. With a timing referred to as 'gate open,' the pixel transistor Tr employed in the pixel circuit 2 is put in a turned-on state in order to connect the pixel electrode of the pressure sensor S in the pixel circuit 2 to the data signal line LS.

Then, at the start of a read period, the switch 52 is put in a turned-on state, allowing the sensor signal Sig appearing on the data signal line LS to be supplied to the input node IN of the inverter 50.

If the pressure sensor S is turned off in this state, the sensor signal Sig should not change from the precharge level. As indicated by the dotted line shown in the diagram of FIG. 5A, however, the sensor signal Sig does change a little bit after the 'gate open' timing. This small change of the sensor signal Sig is caused by the fact that a pixel electric potential stored at a time leading ahead of the present time by one vertical period appears on the data signal line LS after the 'gate open' timing.

Then, in the read period, in response to this small change of the sensor signal Sig, the inverter 50 generates an output at the output node OUT thereof in an incorrect operation as shown in the diagram of FIG. 5A.

By the same token, also for COM-electrode electric potential COM=L shown in the diagram of FIG. 5B, the sensor signal Sig changes a little bit after the 'gate open' timing even if the pressure sensor S is in a turned-off state. Thus, in the same way, the inverter 50 generates an output at the output node OUT thereof in an incorrect operation as shown in the diagram of FIG. 5B.

As is obvious from the characteristic shown in the diagram of FIG. 4A, the ordinary chopper-type comparator carries out an operation to determine whether the input electric potential has changed in the positive or negative direction. If the state of the pressure sensor S is determined in accordance with the characteristic shown in the diagram of FIG. 4B, on the other hand, an operation is carried out to detect an infinitesimal electric-potential change of the sensor signal Sig in order to determine whether the pressure sensor S in a contact or non-contact state as described above.

In the latter case, however, an incorrect operation may be carried out inadvertently. This is because, even if the pressure sensor S is in a turned-off state which should cause the sensor signal Sig to remain unchanged, an infinitesimal electric-potential change is actually observed as described above. Thus, with the pressure sensor S put in a turned-off state, the output of the inverter 50 undesirably becomes unstable.

[3. Configuration and Operations of a Comparator According to an Embodiment]

In order to address the problems described above, a chopper-type comparator shown in FIGS. 6A and 6B is used as a chopper-type comparator 10 according to the embodiment. The chopper-type comparator shown in FIGS. 6A and 6B is capable of providing a high-speed response to an output which is asserted on the data signal line LS by the pressure sensor S when the pressure sensor S is in a contact state and exhibiting a stable-operation characteristic for an output which is asserted on the data signal line LS by the pressure sensor S when the pressure sensor S is in a non-contact state.

Figure 6A:
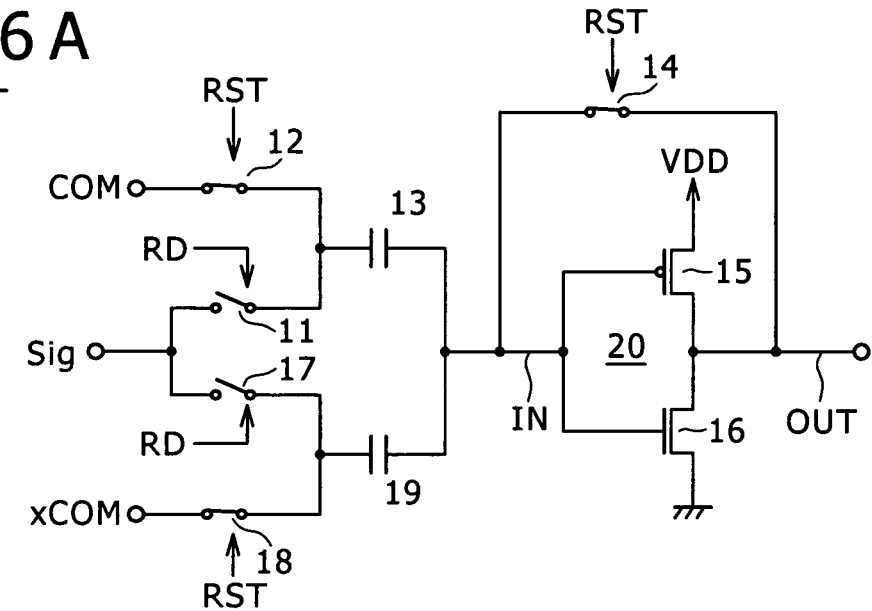
FIGS. 6A and 6B are a plurality of circuit diagrams each showing the circuit of a chopper-type comparator according to the embodiment.
Figure 6B:
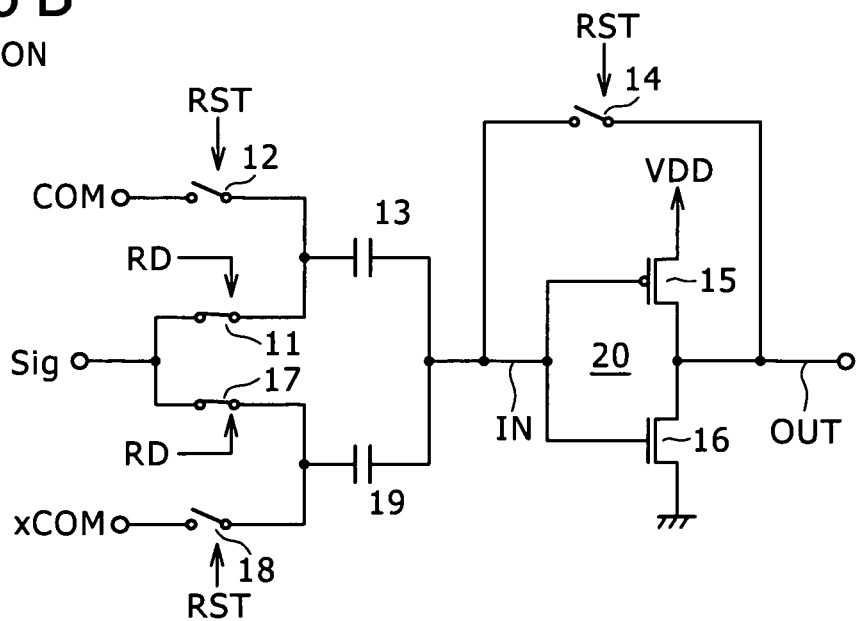

As shown in the circuit diagram of FIG. 6A, the chopper-type comparator according to the embodiment employs switches 11, 12, 14, 17 and 18, a main capacitor 19, an auxiliary capacitor 13 as well as an inverter 20 which includes a P-channel FET 15 and an N-channel FET 16.

The auxiliary capacitor 13 has a capacitance different from the capacitance of the main capacitor 19. The auxiliary capacitor 13 is distinguished from the main capacitor 19 in the following description.

When the switch 12 is sustained in a turned-on state, the COM-electrode electric potential is supplied to a specific node of the auxiliary capacitor 13. The switch 12 is put in a turned-on or turned-off state by a reset signal RST generated by a control circuit which is not shown in the circuit diagram of FIG. 6A.

When the switch 11 is sustained in a turned-on state, on the other hand, the sensor signal Sig appearing on the data signal line LS is supplied to the specific node of the auxiliary capacitor 13. The switch 11 is put in a turned-on or turned-off state by a sensor read signal RD generated by a control circuit which is not shown in the circuit diagram of FIG. 6A.

By the same token, when the switch 18 is sustained in a turned-on state, the inverted COM-electrode electric potential xCOM having a phase opposite to the phase of the COM-electrode electric potential is supplied to a specific node of the main capacitor 19. The switch 18 is put in a turned-on or turned-off state by the reset signal RST along with the switch 12.

When the switch 17 is sustained in a turned-on state, on the other hand, the sensor signal Sig appearing on the data signal line LS is supplied to the specific node of the main capacitor 19. The switch 17 is put in a turned-on or turned-off state by the sensor read signal RD along with the switch 11.

The other nodes of the auxiliary capacitor 13 and the main capacitor 19 are connected to each other to serve as a node IN wired to the gate nodes of the P-channel FET 15 and the N-channel FET 16 which are employed in the inverter 20.

The switch 14 is also put in a turned-on or turned-off state by the reset signal RST. With the switch 14 put in a turned-on state, the input of the inverter 20 is connected to the output thereof.

The chopper-type comparator according to the embodiment is different from the ordinary chopper-type comparator shown in the circuit diagrams of FIGS. 3A and 3B that, in the case of the chopper-type comparator according to the embodiment, the auxiliary capacitor 13 is newly added. In addition, new means is also added to serve as means for precharging the specific node of the auxiliary capacitor 13 to an electric charge different from the electric potential to which the main capacitor 19 is precharged. In the case of this embodiment, the electric potential to which the auxiliary capacitor 13 is precharged is the COM-electrode electric potential COM.

The additional circuit including the auxiliary capacitor 13 allows the threshold voltage of the chopper-type comparator to be adjusted in accordance with the amount of electric charge stored in the auxiliary capacitor 13.

Thus, by adjusting the capacitance of the auxiliary capacitor 13, a proper insensitive zone can be provided. As a result, it is possible to implement the high-speed response for the contact state of the pressure sensor S and the stable operation for the non-contact state of the pressure sensor S.

As described above, FIG. 6A is a circuit diagram showing the chopper-type comparator which is operating in a reset state during a precharge period. On the other hand, FIG. 6B is a circuit diagram showing the chopper-type comparator which is operating in a comparison state of converting the sensor signal Sig into a binary value of digital data during a read period.

In the reset state shown in the circuit diagram of FIG. 6A, each of the switches 12 and 18 employed in the chopper-type comparator is sustained in a turned-on state by the reset signal RST. Thus, the specific node of the main capacitor 19 is set at the level of the inverted COM-electrode electric potential xCOM which is the precharge electric potential. On the other hand, the specific node of the auxiliary capacitor 13 is set at the level of the COM-electrode electric potential COM which is an electric potential having a phase opposite to the phase of the precharge electric potential.

At the same time, the switch 14 is also sustained in a turned-on state as well, connecting the input of the inverter 20 to the output thereof. With the input of the inverter 20 connected to the output thereof, the input of the inverter 20 is set at a level close to the threshold voltage of the inverter 20.

Then, when a comparison process is being carried out during the read period shown in the timing diagram of FIG. 2, each of the switches 12 and 18 employed in the chopper-type comparator is sustained in a turned-off state as shown in the circuit diagram of FIG. 6B. At the same time, the switch 14 is also sustained in a turned-off state as well.

Then, the sensor read signal RD puts the switches 11 and 17 in a turned-on state. In this state, the specific node of the main capacitor 19 is connected to the specific node of the auxiliary capacitor 13. In addition, the specific node of the main capacitor 19 and the specific node of the auxiliary capacitor 13 are also connected to the data signal line LS conveying the sensor signal Sig which is appearing at the output node of the pressure sensor S.

In equations given below, reference notation C1 denotes the capacitance of the main capacitor 19, reference notation C2 denotes the capacitance of the auxiliary capacitor 13, reference notation Cs denotes the wire-load capacitance of the data signal line LS, reference notation Vt denotes the level of the electric potential appearing at the input node IN of the inverter 20 in the reset state, reference notation Vt' denotes the level of the electric potential appearing at the input node IN of the inverter 20 in the comparison state and reference notation Vs denotes the level of the sensor signal Sig.

In accordance with the law of electric-charge conservation over the reset operation period and the comparison process period, Eqs. (1) and (2) given as follows hold true.

$$C1(xCOM-Vt)+C2(COM-Vt)+Cs \cdot xCOM = C1(Vs-Vt')+C2(Vs-Vt')+Cs \cdot Vs \quad (1)$$

$$C1(Vt-xCOM)+C2(Vt-COM) = C1(Vt'-Vs)+C2(Vt'-Vs) \quad (2)$$

Eq. (3) given as follows is derived from Eq. (2):

$$Vt' = Vt - (C1 \cdot xCOM + C2 \cdot COM)/(C1+C2) + Vs \quad (3)$$

The expression on the right-hand side of Eq. (3) is substituted into the expression on the right-hand side of Eq. (1) to serve as a replacement for Vt' in order to obtain the following equation:

$$\text{Expression on the right-hand side of Eq. (1)} = C1(xCOM-Vt)+C2(COM-Vt)+Cs \cdot Vs \quad (4)$$

Thus, the following equation is obtained:

$$Vs = xCOM$$

By substituting Eq. (4) into Eq. (3), the inverter input level Vt' at a transition from the reset operation to the comparison process can be found as Eq. (5) as follows:

$$Vt' = Vt - \{(C1 \cdot xCOM + C2 \cdot COM)/(C1+C2) - xCOM \quad (5)$$

Eq. (5) implies that the level of the electric potential appearing at the inverter input node IN at a transition from the reset operation to the comparison process is shifted by a quantity Y expressed by the following expression:

$$Y=(C1 \cdot xCOM+C2 \cdot COM)/(C1+C2)-xCOM \quad (6)$$

Figure 7:
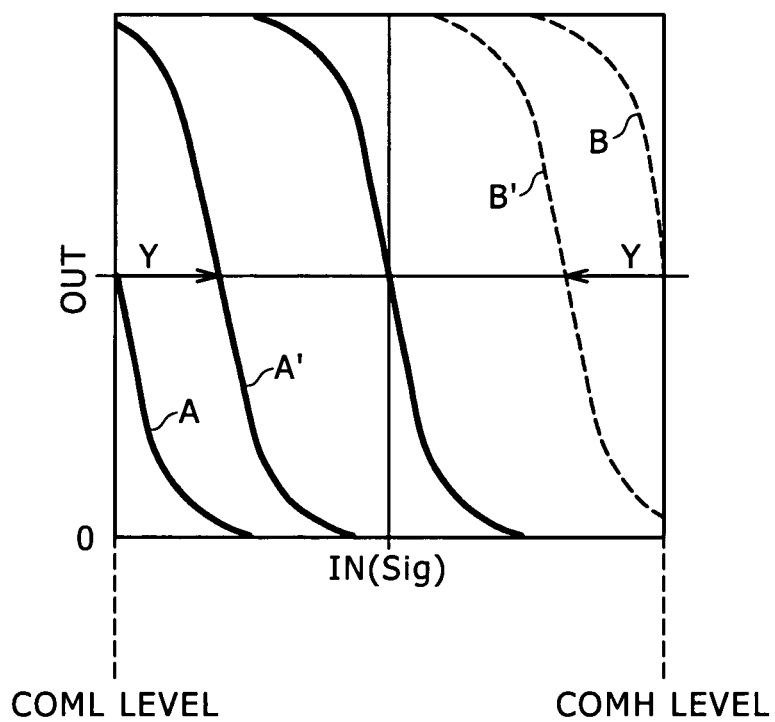
FIG. 7 is an explanatory diagram showing characteristics of the chopper-type comparator according to the embodiment.

In other words, as shown in a diagram of FIG. 7, the threshold voltage of the chopper-type comparator can be said to be shifted by the quantity Y which is expressed by Eq. (6). That is to say, a solid line A' and a dashed line B' are the input-output characteristics.

Operations carried out by the chopper-type comparator including the inverter 20 are explained by referring to diagrams of FIGS. 8A and 8B. An upper diagram of FIG. 8A is an explanatory diagram showing the sensor signal Sig, the input IN which is supplied to the inverter 20 and the output OUT which is generated by the inverter 20 when the pressure sensor S is in the turned-off state corresponding to the non-contact state in the case of a COM-electrode electric potential set at the H level whereas a lower diagram of FIG. 8A is an explanatory diagram showing the sensor signal Sig, the input IN which is supplied to the inverter 20 and the output OUT which is generated by the inverter 20 when the pressure sensor S is in the turned-on state corresponding to the contact state in the case of a COM-electrode electric potential set at the H level. On the other hand, an upper diagram of FIG. 8B is an explanatory diagram showing the sensor signal Sig, the input IN which is supplied to the inverter 20 and the output OUT which is generated by the inverter 20 when the pressure sensor S is in the turned-off state corresponding to the non-contact state in the case of a COM-electrode electric potential set at the L level whereas a lower diagram of FIG. 8B is an explanatory diagram showing the sensor signal Sig, the input IN which is supplied to the inverter 20 and the output OUT which is generated by the inverter 20 when the pressure sensor S is in the turned-on state corresponding to the contact state in the case of a COM-electrode electric potential set at the L level.

In each of the diagrams of FIGS. 8A and 8B, a solid line represents the electric potential of the output OUT appearing at the output node OUT of the inverter 20, a dashed line represents the electric potential of the input IN appearing at the input node IN of the inverter 20 and a dotted line represents the sensor signal Sig.

The precharge period is a period in which the chopper-type comparator is in the reset state shown in the circuit diagram of FIG. 6A. In this state, the input of the inverter 20 is connected to the output thereof, setting the input and the output at the same electric potential. With a timing referred to as 'gate open,' the pixel transistor Tr employed in the pixel circuit 2 is put in a turned-on state, connecting the pixel electrode of the pressure sensor S in the pixel circuit 2 to the data signal line LS.

Then, at the start of the read period, each of the switches 11 and 17 is put in a turned-on state as shown in the circuit diagram of FIG. 6B, allowing the sensor signal Sig appearing on the data signal line LS to be supplied to the input node IN of the inverter 20.

If the pressure sensor S is turned-off in this state, the sensor signal Sig should not change from the precharge level. As indicated by the dotted line shown in the upper diagram of FIG. 8A for the non-contact state corresponding to the turned-off state of the pressure sensor S, however, the sensor signal Sig does change a little bit after the 'gate open' timing. As explained earlier by referring to the diagrams of FIGS. 5A and 5B, this small increase change of the sensor signal Sig is caused by the fact that a pixel electric potential stored at a time leading ahead of the present time by one vertical period appears on the data signal line LS after the 'gate open' timing.

In order to solve this problem, an offset corresponding to the shift quantity Y shown in the diagram of FIG. 7 is applied to the input IN to serve as an offset for the threshold voltage of the inverter 20 as indicated by an offset OFS shown in the upper diagram of FIG. 8A to give an offset level represented by a thin dashed line. Thus, in the read period, the effect of this small increase change of the sensor signal Sig on the input IN represented by a bold dashed line is an increase from the offset level.

For the threshold voltage of the inverter 20, such an input IN is not an electric potential which represents the existence of a change in electric potential. Thus, a correct output OUT is obtained. In the case of the upper diagram of FIG. 8A for the non-contact state, the correct output OUT is an output set at the H level.

It is to be noted that, in the case of the contact state shown in the lower diagram of FIG. 8A as a state corresponding to the turned-on state of the pressure sensor S, the sensor signal Sig increases, resulting in a correct output OUT. In the case of the lower diagram of FIG. 8A for the contact state, the correct output OUT is an output set at the L level.

The explanation given above also holds true of the case shown in the upper and lower diagrams of FIG. 8B as the case of a COM-electrode electric potential set at the L level. That is to say, an offset corresponding to the shift quantity Y shown in the diagram of FIG. 7 is applied to the input IN to serve as an offset for the threshold voltage of the inverter 20 as indicated by an offset OFS shown in the upper diagram of FIG. 8B to give an offset level represented by a thin dashed line. Thus, in the read period, the effect of this small decrease change of the sensor signal Sig on the input IN represented by a bold dashed line is a decrease from the offset level.

For the threshold voltage of the inverter 20, such an input IN is not an electric potential which represents the existence of a change in electric potential. Thus, a correct output OUT is obtained. In the case of the upper diagram of FIG. 8B for the non-contact state, the correct output OUT is an output set at the L level.

It is to be noted that, in the case of the contact state shown in the lower diagram of FIG. 8B as a state corresponding to the turned-on state of the pressure sensor S, the sensor signal Sig decreases, resulting in a correct output OUT. In the case of the lower diagram of FIG. 8B for the contact state, the correct output OUT is an output set at the H level.

As described above, the chopper-type comparator shown in the circuit diagrams of FIGS. 6A and 6B detects whether or not the sensor signal Sig changes in order to determine whether or not the pressure sensor S has been put in a turned-on or turned-off state respectively. Thus, the chopper-type comparator is capable of converting the sensor signal Sig into a binary value of digital data in accordance with an accurate result of the detection.

It is to be noted that the shift quantity Y shown in FIG. 7 can be adjusted by changing the ratio of the capacitance C1 of the main capacitor 19 to the capacitance C2 of the auxiliary capacitor 13.

In addition, the larger the amplitude of the COM-electrode electric potential COM, the higher the noise level defined as a level that must be recognized as a non-contact state. In the following description, the amplitude of the COM-electrode electric potential COM is referred to simply as the COM amplitude. However, the shift quantity Y also changes in accordance with the COM amplitude. To put it in detail, the larger the COM amplitude, the wider the insensitive zone representing the shift quantity Y shown in the diagram of FIG. 7 as the shift quantity of the threshold voltage of the inverter 20. That is to say, the smaller the COM amplitude, the narrower the insensitive zone. Thus, the shift quantity Y is adjusted automatically in accordance with noise magnitude changes which are attributed to variations in COM amplitude.

By employing the chopper-type comparator shown in the circuit diagrams of FIGS. 6A and 6B in the embodiment to serve as the chopper-type comparator 10, a desirable liquid-crystal display panel according to the embodiment can be obtained.

That is to say, in comparison with the chopper-type comparator shown in the circuit diagrams of FIGS. 3A and 3B, in the chopper-type comparator according to the embodiment, the auxiliary capacitor 13 as well as the switches 11 and 12 are newly added. In addition, new means is also added to serve as means for precharging the specific node of the auxiliary capacitor 13 to an electric charge different from the electric potential to which the main capacitor 19 is precharged. To put it more concretely, in the case of this embodiment shown in the circuit diagrams of FIGS. 6A and 6B, the electric potential to which the auxiliary capacitor 13 is precharged is the COM-electrode electric potential COM.

Thus, the threshold voltage of the chopper-type comparator 10 can be shifted in accordance with the ratio of the capacitance C1 of the main capacitor 19 to the capacitance C2 of the auxiliary capacitor 13 and the COM amplitude in order to provide a proper insensitive zone. As a result, it is possible to implement the high-speed response for the contact state of the pressure sensor S and the stable operation for the non-contact state of the pressure sensor S.

[4. First Typical Concrete Configuration of a Liquid-Crystal Display Panel According to the Embodiment]

Figure 9:
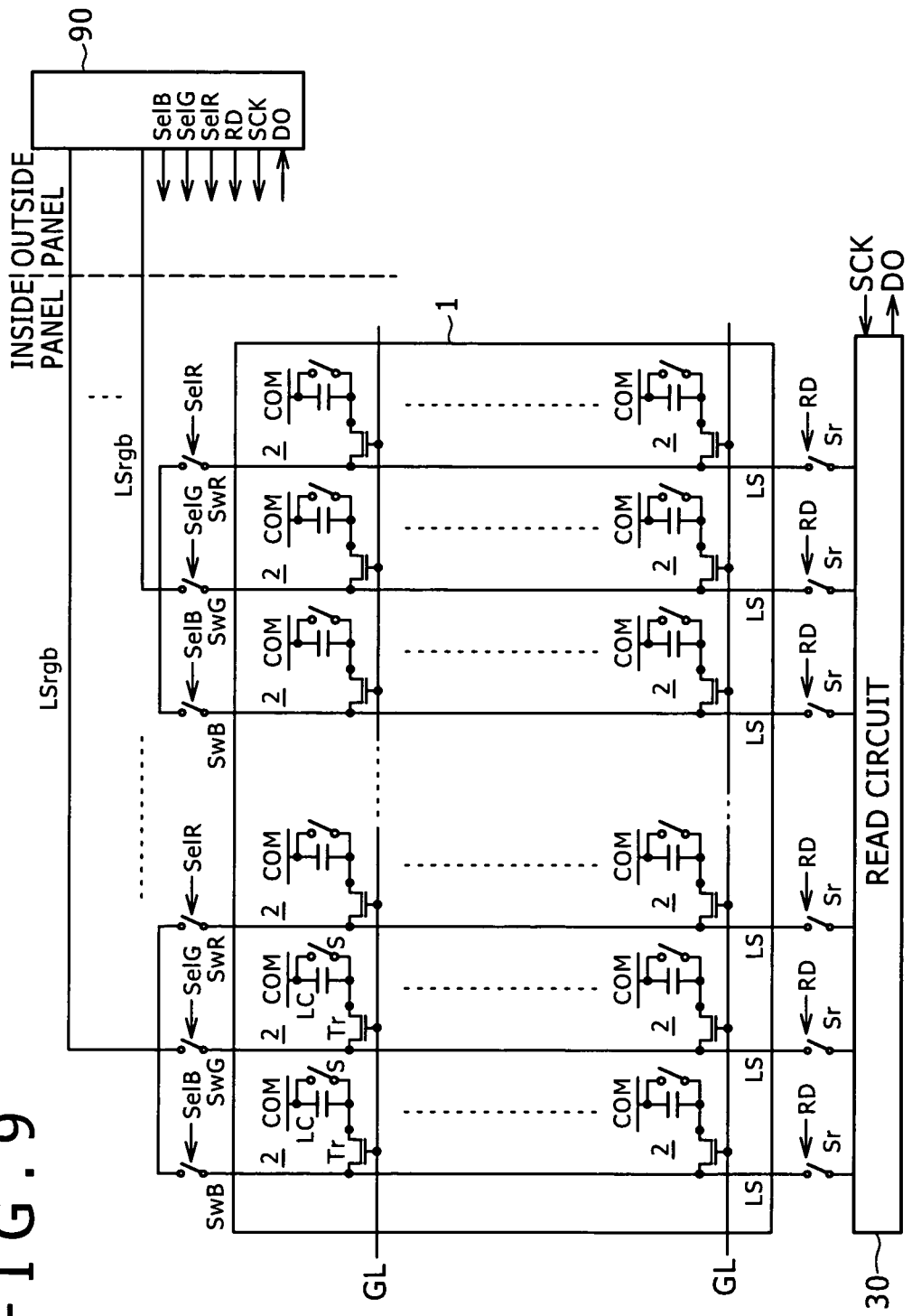
FIG. 9 is an explanatory block diagram showing a first typical concrete configuration of the liquid-crystal display panel according to the embodiment.

FIG. 9 is an explanatory block diagram showing a first typical concrete configuration of a liquid-crystal display panel according to the embodiment. In the explanation of the basic configuration of the liquid-crystal display panel shown in the diagram of FIG. 1, the liquid-crystal display panel is said to have a pixel array 1 employing pixel circuits 2 which are laid out to form a two-dimensional matrix. Each of the pixel circuits 2 is placed at the intersection of one of the data signal lines LS and one of the gate lines GL.

Each of the data signal lines LS on the pixel array 1 is connected by write switches SwB, SwG and SwR as well as a single data signal line LSrgb to an external IC 90. To put it in detail, every three data signal lines LS associated with the B, G and R colors are connected by the write switches SwB, SwG and SwR respectively to the single data signal line LSrgb which is wired to the external IC 90. In addition, each of the data signal lines LS is connected to a read circuit 30 through a read switch Sr.

The external IC 90 sequentially supplies a B data signal value, a G data signal value and an R data signal value during one horizontal period to the data signal lines LS associated with the B, G and R colors by way of the single data signal line LSrgb on a time-division basis.

The external IC 90 generates write signals SelB, SelG and SelR for controlling the write switches SwB, SwG and SwR respectively to enter a turned-on or turned-off state. In addition, the external IC 90 also generates a sensor read signal RD for controlling all the read switches Sr to enter a turned-on or turned-off state.

On top of that, a gate driving circuit not shown in the block diagram of FIG. 9 applies a gate electrode pulse Gate to a gate line GL on every horizontal row of the two-dimensional matrix in order to connect the pixel circuits 2 on the horizontal row to data signal lines LS.

Figure 11:
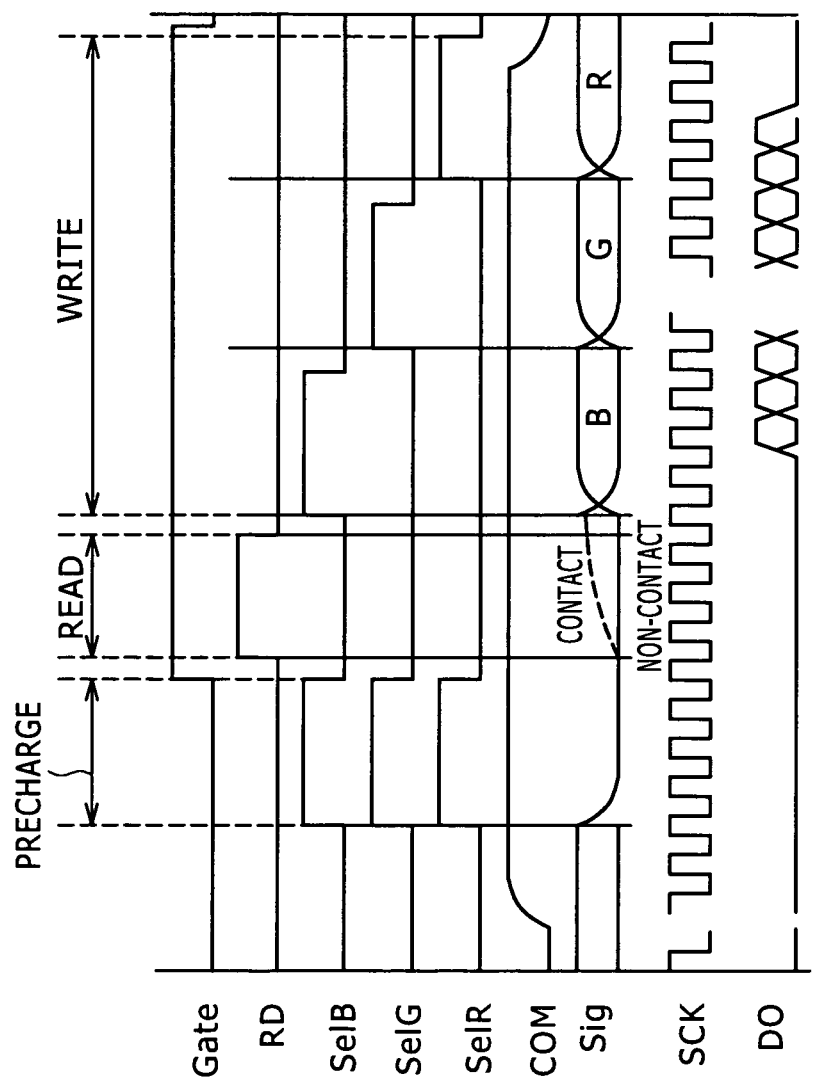
FIG. 11 is a timing diagram showing the waveforms of signals generated during operations carried out in the first typical configuration of the liquid-crystal display panel according to the embodiment.

FIG. 11 is a timing diagram showing the waveforms of the gate electrode pulse Gate, the sensor read signal RD as well as the write signals SelB, SelG and SelR. The timing diagram shows the waveforms of these signals which appear in one horizontal period. In addition, the timing diagram of FIG. 11 also shows the waveforms of a COM-electrode electric potential appearing on the COM electrode, a sensor-signal electric potential Sig appearing on the data signal line LS, a clock signal SCK and a signal representing the output DO of a shift register 31 employed in the read circuit 30. The gate electrode pulse Gate, the sensor read signal RD, the write signals SelB, SelG and SelR, the COM-electrode electric potential as well as the sensor signal Sig have been explained before by referring to the timing diagram of FIG. 2. The clock signal SCK and the signal representing the output DO will be explained later. A precharge operation, a sensor read operation as well as operations to write a B data signal value, a G data signal value and an R data signal value into pixel circuits 2 are carried out with timings determined in advance.

Figure 10:
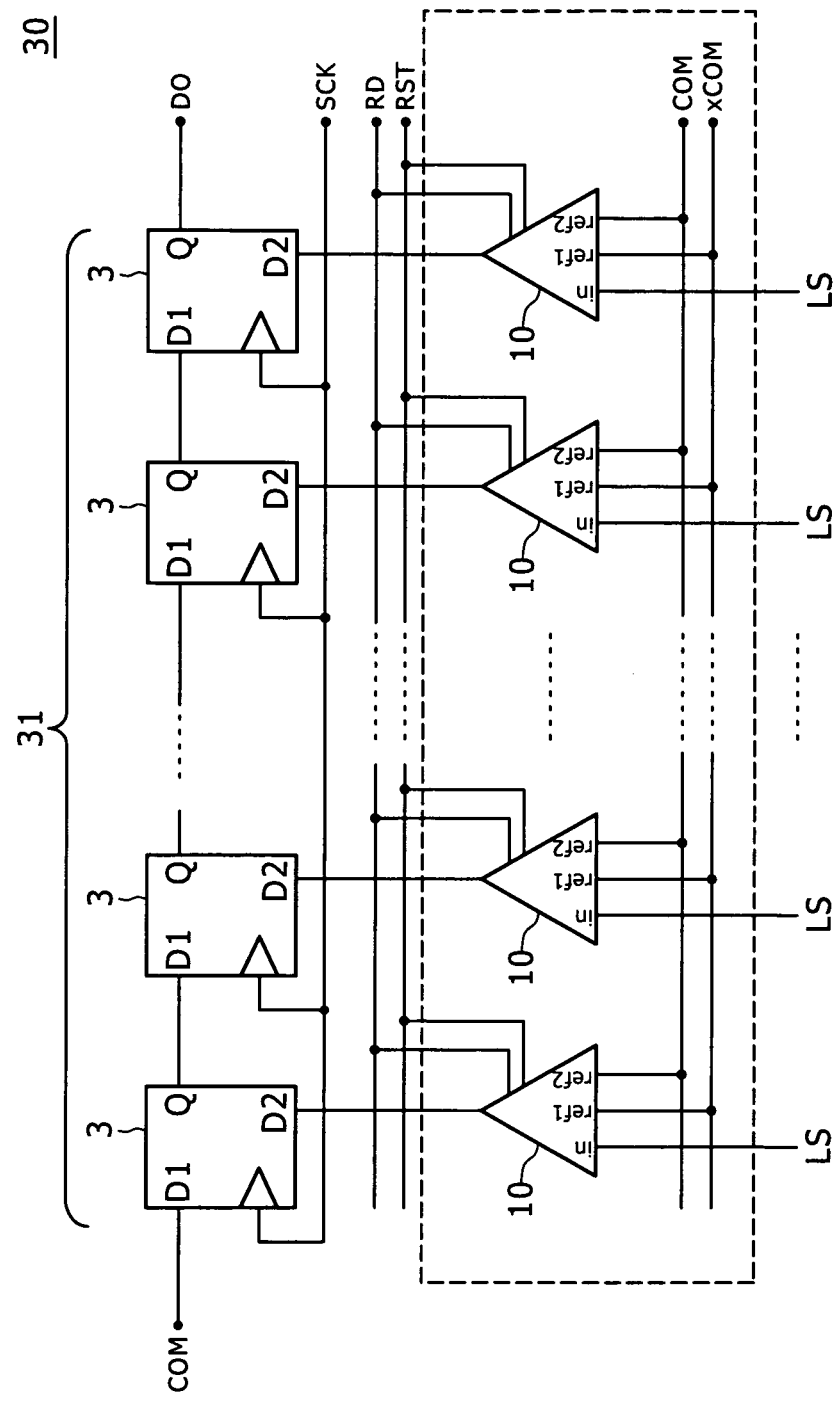
FIG. 10 is a block diagram showing the configuration of a read circuit employed in the liquid-crystal display panel according to the embodiment.

FIG. 10 is a block diagram showing the configuration of the read circuit 30. As shown in the diagram, the read circuit 30 employs chopper-type comparators 10 each provided for a data signal line LS and a shift register 31 which serves as a parallel/serial conversion section including latch circuits 3 which are used for converting binary values each output by one of the comparators 10 into serial data. Each of the chopper-type comparators 10 is the chopper-type comparator shown in the diagrams of FIGS. 6A and 6B. Each of the latch circuits 3 is a D-type flip-flop. For example, each of the latch circuits 3 is a TGFF (Transmission-Gate Flip-Flop).

The sensor signal Sig appearing on the data signal line LS is supplied to the chopper-type comparator 10 as the input IN by way of the sensor read switch Sr. The inverted COM-electrode electric potential xCOM is supplied as an input ref1 to the chopper-type comparator 10. As shown in the circuit diagrams of FIGS. 6A and 6B, the inverted COM-electrode electric potential xCOM is supplied to the specific node of the main capacitor 19 by way of the switch 18. On the other hand, the COM-electrode electric potential COM is supplied as an input ref2 to the inverter 20. As shown in the circuit diagrams of FIGS. 6A and 6B, the COM-electrode electric potential COM is supplied to the specific node of the auxiliary capacitor 13 by way of the switch 12.

In addition, every chopper-type comparator 10 also receives the sensor read signal RD and the reset signal RST. As shown in the circuit diagrams of FIGS. 6A and 6B, the sensor read signal RD is supplied to the switches 11 and 17 whereas the reset signal RST is supplied to the switches 12, 14 and 18.

The chopper-type comparator 10 carries out a reset operation in the reset state shown in the circuit diagram of FIG. 6A during a precharge period shown in the timing diagram of FIG. 11. During a comparison period shown in the timing diagram of FIG. 11, on the other hand, the chopper-type comparator 10 carries out a comparison process in the comparison state shown in the circuit diagram of FIG. 6B.

The binary value output by each chopper-type comparator 10 is supplied to the D2 terminal of a latch circuit 3. The COM-electrode electric potential COM is supplied to the D1 terminal of the first (leftmost in the circuit diagram of FIG. 10) latch circuit 3. The Q output of any particular latch circuit 3 is supplied to the D1 of a latch circuit 3 immediately succeeding the particular latch circuit 3 except that the Q output of the last (rightmost in the circuit diagram of FIG. 10) latch circuit 3 is supplied to a recipient external to the liquid-crystal display panel as the output DO of the shift register 31. In the configuration of the shift register 31, binary values output by the chopper-type comparators 10 are converted from parallel data into serial data which is supplied to the recipient external to the liquid-crystal display as the output DO. The recipient external to the liquid-crystal display panel is a portion of the external IC 90 shown in the diagram of FIG. 9. In this way, the external IC 90 also serving as the recipient external to the liquid-crystal display panel is capable of detecting information generated by the sensors S.

It is to be noted that each of the latch circuits 3 is driven by a clock signal SCK which is also generated by the external IC 90.

The following description explains timings to read out information generated by the pressure sensor S and transfer the information to the read circuit 30. As is obvious from the descriptions with reference to the timing diagrams of FIG. 11 (and FIG. 2), information is read out by the chopper-type comparator 10 from the pressure sensor S by detecting a change of the sensor signal Sig in a read period. Then, the information read out from the pressure sensors S employed in the pixel circuits 2 on one horizontal row of the two-dimensional matrix is output as the output DO shown in the timing diagram of FIG. 11 and transferred to the read circuit 30 in a write period which immediately lags behind the read period.

The charging speed of the data signal line LS is examined as follows. If a low-temperature polysilicon TFT (Thin-Film Transistor) is used as the pixel transistor Tr, the turned-on resistance of the pixel transistor Tr is about several hundreds of kilo-ohms. In addition, if the liquid-crystal display panel is used as a small-size display panel in a mobile apparatus having dimensions of several inches, the parasitic capacitance of the data signal line LS is about several tens of pF. Thus, the inverter 20 can be put in a turned-on state completely within a period of about 10 microseconds.

If an amorphous silicon TFT is used as the pixel transistor Tr, on the other hand, the turned-on resistance of the pixel transistor Tr is in the order of mega-ohms so that it is extremely difficult to detect a change of the sensor signal Sig appearing on the data signal line LS.

That is to say, if a low-temperature polysilicon TFT is used as the pixel transistor Tr, a sensor output appearing on the data signal line LS can be read out within a period of about 10 microseconds. Thus, within the read period in which the sensor read signal RD is being sustained at the H level, it is possible to provide the latch circuits 3 forming the shift register 31 with the turned-on/turned-out state information indicating whether or not a pressure is being applied from an external pressure source to the liquid-crystal display panel.

In the liquid-crystal display panel according to the embodiment having the configuration described above, every data signal line LS is provided with a read switch Sr. The read circuit 30 employing chopper-type comparators 10 and a shift register 31 reads out information from a pressure sensor S employed in every pixel circuit 2. In this case, by employing a write system based on the selector method, the number of data signal lines connecting the liquid-crystal display panel to the external IC 90 can be reduced and, at the same time, it is possible to minimize the number of lines which are used for transferring information read out from the sensors S employed in the pixel circuits 2 to a recipient external to the liquid-crystal display panel.

In addition, by constructing the liquid-crystal display panel from low-temperature polysilicon TFTs, it is possible to transfer sensor information from pixel circuits 2 to the shift register serving as the parallel-serial conversion section 31 within a period of several microseconds before the operation to write B, G and R signal values into the pixel circuits 2. As a result, during the operation to write the next B, G and R signal values into the pixel circuits 2, the sensor information can be converted into the serial output DO.

[5. Second Typical Concrete Configuration of the Liquid-Crystal Display Panel According to the Embodiment]

Figure 12:
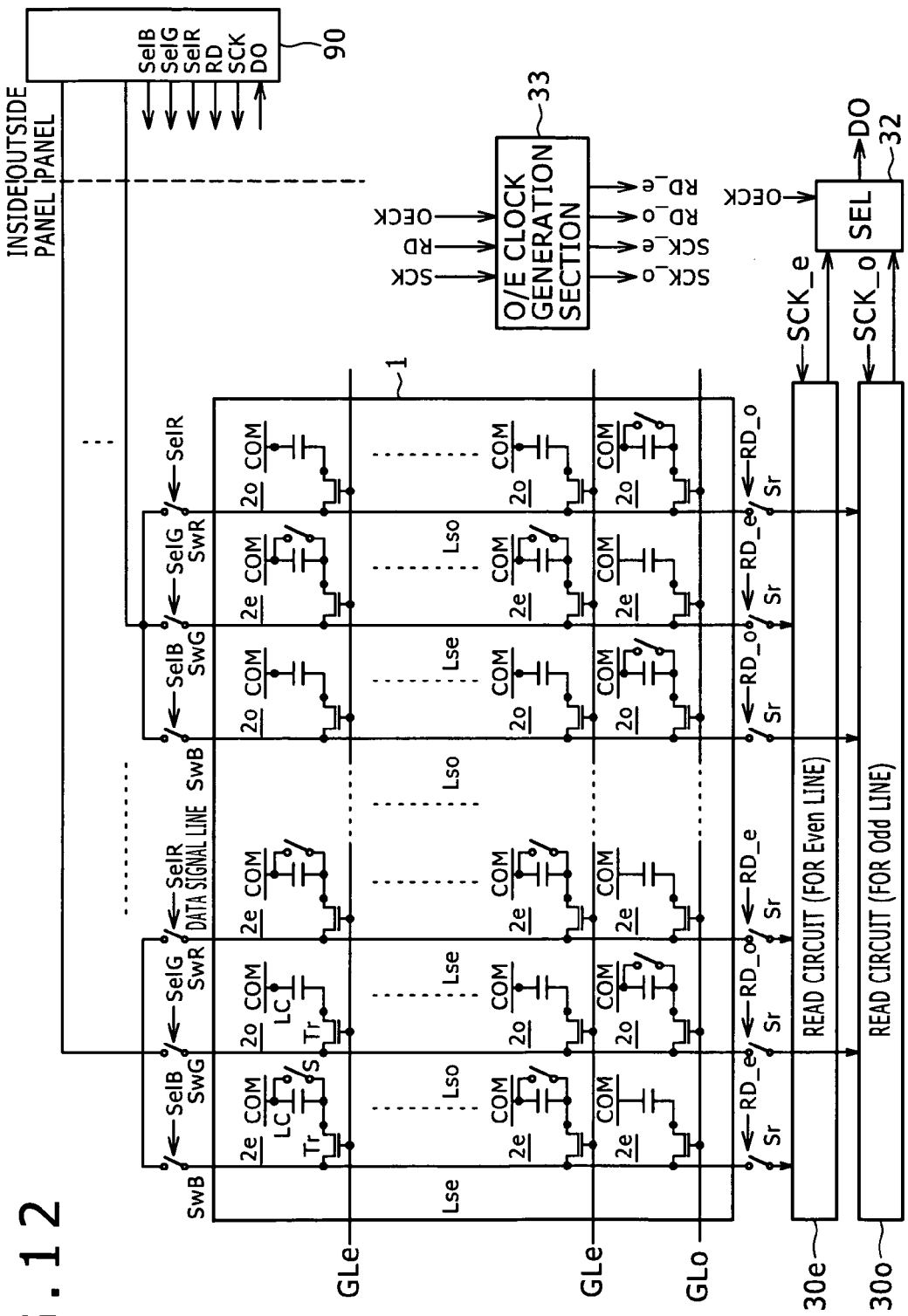
FIG. 12 is a block diagram showing a second typical concrete configuration of the liquid-crystal display panel according to the embodiment.

FIG. 12 is a block diagram showing a second typical concrete configuration of a liquid-crystal display panel according to the embodiment. If a pressure sensor S is employed in each pixel circuit, in principle, the maximum sensor density is determined by the number of pixel circuits laid out in the pixel array. If pressure sensors S are used in implementation of the touch-panel function, it is necessary to carry out the function to merely detect the contact or non-contact state of a finger or a touch pen with the pixel array 1 employed in the liquid-crystal display panel. Thus, a sensor density corresponding to a pixel pitch of about several hundreds of micrometers is not really required. In addition, taking the load of data processing carried out at a later stage into consideration, reducing the number of pressure sensors S to a certain extent on the basis of a thinning principle is practical.

The second typical configuration shown in the diagram of FIG. 12 is a proposed configuration having a sensor layout in which pressure sensors S are embedded not in all the pixel circuits 2. At the very most, a pressure sensor S is provided every other pixel circuit 2.

In the second typical configuration shown in the diagram of FIG. 12, reference notation 2*e* denotes a pixel circuit 2 on an even-numbered column of the two-dimensional matrix on the pixel array 1 whereas reference notation 2*o* denotes a pixel circuit 2 on an odd-numbered column of the same matrix.

An even-numbered column pixel circuit 2*e* may or may not have a pressure sensor S. By the same token, an odd-numbered column pixel circuit 2*o* may or may not have a pressure sensor S. On every row of the whole two-dimensional matrix, a pressure sensor S is provided every other pixel circuit 2. In the same way, on every column of the whole two-dimensional matrix, a pressure sensor S is provided every other pixel circuit 2.

In the second typical configuration shown in the diagram of FIG. 12, reference notation GLe denotes a gate line GL on an even-numbered row of the two-dimensional matrix on the pixel array 1 whereas reference notation GLo denotes a gate line GL on an odd-numbered row of the same matrix.

As is obvious from the figure, an even-numbered row gate line GLe is connected to pixel circuits 2*e* and 2*o* and pixel circuits 2*e* on an even-numbered column each have a pressure sensor S. By the same token, an odd-numbered row gate line GLo is also connected to pixel circuits 2*e* and 2*o*, and pixel circuits 2*o* on an odd-numbered column each have a pressure sensor S.

In addition, there are two types of read circuit 30 which include a chopper-type comparator 10 and a shift register 31. One of the types is an even-number read circuit 30*e* and the other type is an odd-number read circuit 30*o*.

The even-number read circuit 30*e* is connected to every even-numbered column data signal line LSe through a read switch Sr. On the other hand, the odd-number read circuit 30*o* is connected to every odd-numbered column data signal line LSo through a read switch Sr.

An O/E clock generation section 33 is a section configured to generate necessary signals from a clock signal SCK received from the external IC 90, the sensor read signal RD also generated by the external IC 90 and an odd/even clock signal OECK which is typically generated from a horizontal sync signal. The necessary signals generated by the O/E clock generation section 33 include an odd clock signal SCK_o, an even clock signal SCK_e, an odd-number sensor read signal RD_o and an even-number sensor read signal RD_e.

The even clock signal SCK_e is supplied to the shift register 31 of the even-number read circuit 30*e* as a transfer clock signal. By the same token, the odd clock signal SCK_o is supplied to the shift register 31 of the odd-number read circuit 30o as a transfer clock signal.

The even-number sensor read signal RD_e is used as a control signal for putting a read switch Sr provided on each even-numbered column data signal line LSe in a turned-on or turned-off state. By the same token, the odd-number sensor read signal RD_o is used as a control signal for putting a read switch Sr provided on each odd-numbered column data signal line LSo in a turned-on or turned-off state.

An output selector 32 is a section configured to select either the output of the even-number read circuit 30e or the output of the odd-number read circuit 30o on the basis of the odd/even clock signal OECK and supply the selected output to the external IC 90 as a serial output DO representing sensor information.

Figure 13:
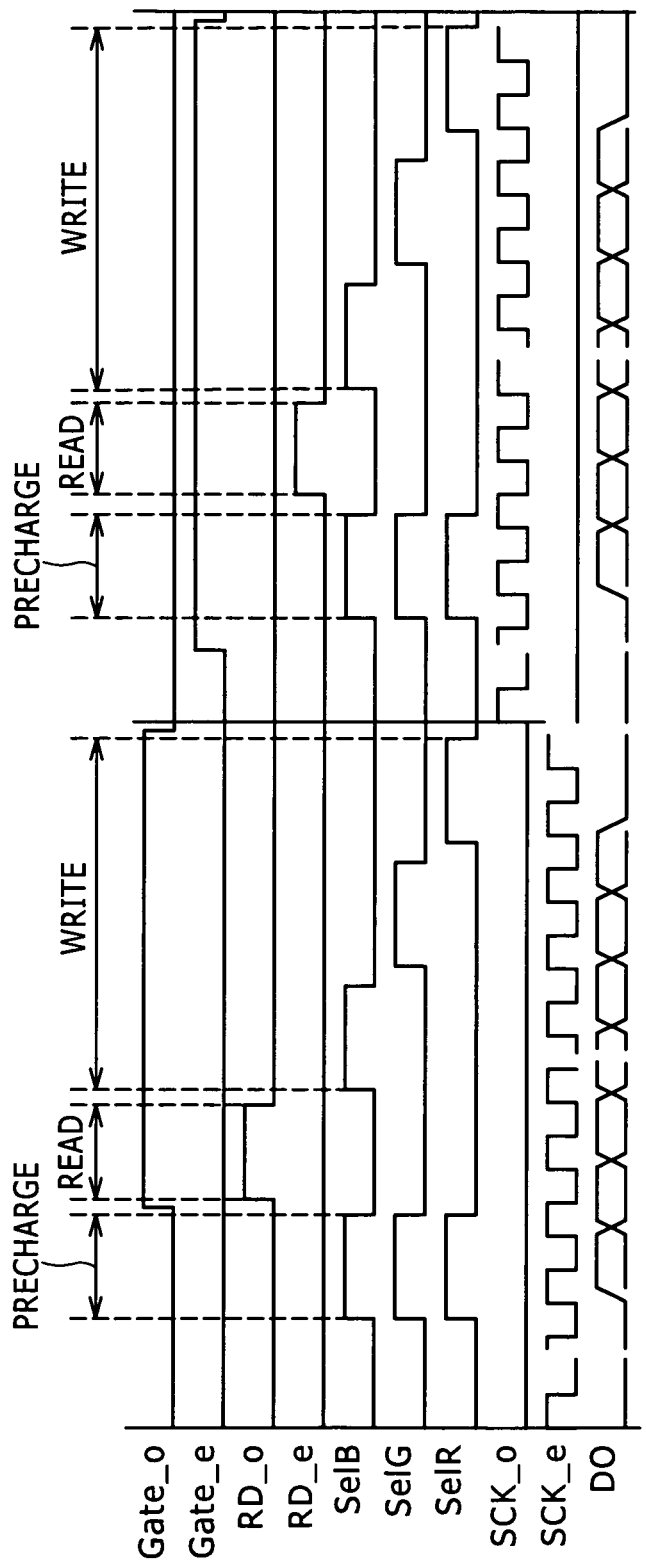
FIG. 13 is a timing diagram showing the waveforms of signals generated during operations carried out in the second typical configuration of the liquid-crystal display panel according to the embodiment.

FIG. 13 is a timing diagram showing waveforms of signals generated in the second typical concrete configuration of the liquid-crystal display panel according to the embodiment for two horizontal periods, i.e., first and second horizontal periods.

First of all, during a precharge period in the first horizontal period, a precharge operation is carried out on the data signal lines LSe and LSo on even-numbered and odd-numbered columns respectively. Then, an H-level gate-electrode pulse Gate_o is asserted on a particular gate line GLo on an odd-numbered row in order to connect the pixel circuits 2 on the row to the data signal lines LSe and LSo.

Subsequently, the sensor read signal RD_o for every odd-numbered column is set at the H level in order to put the read switch Sr on every odd-numbered column in a turned-on state so as to start a read period after the precharge period. In this read period, sensor information is supplied to the odd-number read circuit 30o from every pixel circuit 2o provided at the intersection of each odd-numbered column and the odd-numbered row corresponding to the particular gate line GLo on which the H-level gate-electrode pulse Gate_o has been asserted.

Then, in the same first horizontal period, operations are carried out to write B, G and R signal values into pixel circuits 2 sequentially in the same way as the write operations carried out by the first typical configuration shown in the diagram of FIG. 9 as explained before by referring to the timing diagram of FIG. 11. In this first horizontal period, however, the odd clock signal SCK_o is sustained at the L level so that the sensor information supplied to the odd-number read circuit 30o from the intersection of each odd-numbered column and the odd-numbered row corresponding to the particular gate line GLo is not transferred as serial data to the output selector 32.

The sensor information supplied to the odd-number read circuit 30o from the intersection of each odd-numbered column and the odd-numbered row corresponding to the particular gate line GLo is transferred as serial data to the output selector 32 in the second horizontal period immediately lagging behind the first horizontal period. That is to say, in the second horizontal period, the shift register 31 employed in the odd-number read circuit 30o transfers the sensor information, which has been latched in the shift register 31 during the first horizontal period, to the output selector 32 in accordance with the odd clock signal SCK_o. During the second horizontal period, the output selector 32 selects the output of the odd-number read circuit 30o and supplies the selected output to the external IC 90 as a serial output DO representing sensor information.

As described above, while sensor information is being transferred from the odd-number read circuit 30o to the output selector 32 during the second horizontal period as described above, next operations are carried out as follows.

To put it in detail, first of all, during a precharge period in the second horizontal period, a precharge operation is carried out on the data signal lines LSe and LSo on even-numbered and odd-numbered columns respectively. Then, an H-level gate-electrode pulse Gate_e is asserted on a particular gate line GLe on an even-numbered row in order to connect the pixel circuits 2 on the row to the data signal lines LSe and LSo.

Subsequently, the sensor read signal RD_e for every even-numbered column is set at the H level in order to put the read switch Sr of the even-numbered data signal line LSe on every even-numbered column in a turned-on state so as to start a read period after the precharge period. In this read period, sensor information is supplied to the even-number read circuit 30e from every pixel circuit 2e provided at the intersection of each even-numbered column and the even-numbered row corresponding to the particular gate line GLe on which the H-level gate-electrode pulse Gate_e has been asserted.

Then, operations are carried out to write B, G and R signal values into pixel circuits 2 are carried out sequentially in the same way as the write operations carried out by the first typical configuration shown in the diagram of FIG. 9 as explained before by referring to the timing diagram of FIG. 11. In this second horizontal period, however, the even clock signal SCK_e is sustained at the L level so that the sensor information supplied to the even-number read circuit 30e from the intersection of each even-numbered column and the even-numbered row corresponding to the particular gate line GLe is not transferred as serial data to the output selector 32.

The sensor information supplied to the even-number read circuit 30e from the intersection of each even-numbered column and the even-numbered row corresponding to the particular gate line GLe is transferred as serial data to the output selector 32 in the third horizontal period immediately lagging behind the second horizontal period. That is to say, in the third horizontal period, the shift register 31 employed in the even-number read circuit 30e transfers the sensor information, which has been latched in the shift register 31 during the second horizontal period, to the output selector 32 in accordance with the even clock signal SCK_e. During the third horizontal period, the output selector 32 selects the output of the even-number read circuit 30e and supplies the selected output to the external IC 90 as a serial output DO representing sensor information.

As described above, on every horizontal row which can be an even-numbered or odd-numbered row, a pressure sensor S is provided in every other pixel circuit 2. In addition, two read circuits are provided for the even-numbered and odd-numbered columns respectively. To put it more concretely, the even-number read circuit 30e is provided for pixel circuits 2e which are each located at the intersection of an even-numbered column data signal line LSe and an even-numbered gate line GLe. On the other hand, the odd-number read circuit 30o is provided for pixel circuits 2o which are each located at the intersection of an odd-numbered column data signal line LSo and an odd-numbered row gate line GLo. Operations carried out on the even-numbered rows are carried out alternately to operations carried out on the odd-numbered rows. Thus, it is possible to carry out an operation to read out sensor information from a row to a particular read circuit 30 in a specific horizontal period and an operation to transfer the serial data of the sensor information from the particular read circuit 30 to the external IC 90 in a horizontal period immediately lagging behind the specific horizontal period. As a result, the frequency of the clock signal SCK used in the operation to transfer the serial data of the sensor information can be lowered so as to carry out the transfer operation in a more stable manner.

[6. Other Typical Configuration of the Comparator According to the Embodiment]

Figure 14A:
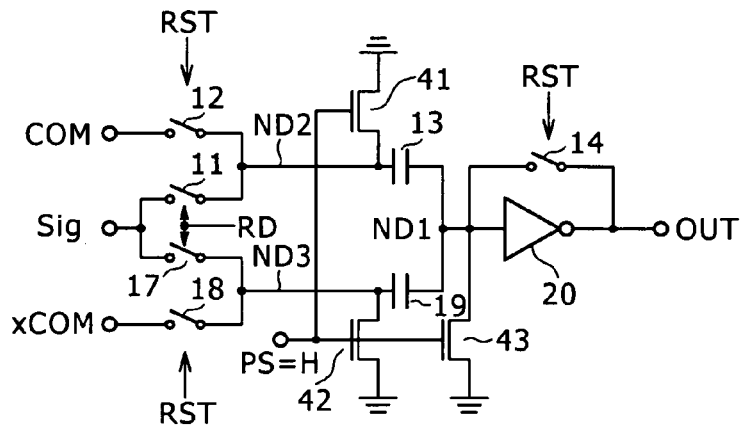
FIGS. 14A to 14C are a plurality of circuit diagrams each showing another typical configuration of the chopper-type comparator according to the embodiment.
Figure 14B:
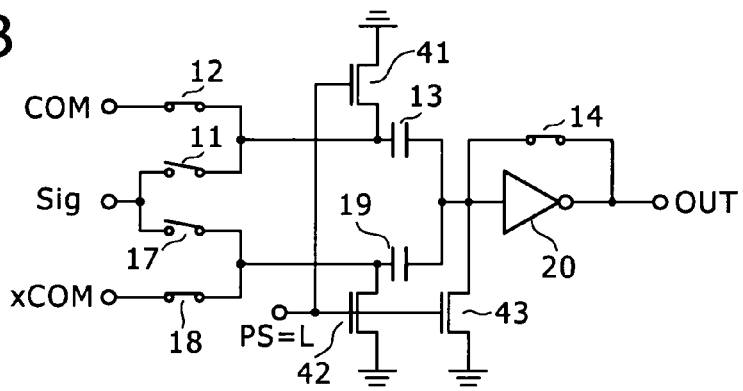
Figure 14C:
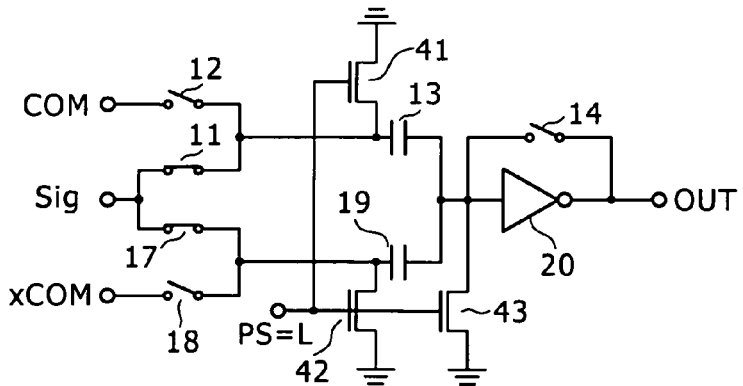

FIGS. 14A to 14C are a plurality of circuit diagrams each showing another typical configuration of the chopper-type comparator 10 shown in the circuit diagrams of FIGS. 6A and 6B as the chopper-type comparator 10 according to the embodiment.

To be more specific, FIG. 14A is a circuit diagram of the other typical configuration of the chopper-type comparator 10 which is operating in a power-save state. As shown in the circuit diagram of FIG. 14A, in addition to the components employed in the chopper-type comparator 10 shown in the circuit diagrams of FIGS. 6A and 6B, the other typical configuration of the chopper-type comparator 10 also includes N-channel transistors 41, 42 and 43. That is to say, the other typical configuration of the chopper-type comparator 10 is characterized in that the other typical configuration of the chopper-type comparator 10 also includes the N-channel transistors 41, 42 and 43 for providing a power-save period allocated to a power-save mode in power-save state.

The drain and source nodes of the N-channel transistor 41 are connected between a specific node ND2 of the auxiliary capacitor 13 and the ground. The drain and source nodes of the N-channel transistor 42 are connected between the other node ND3 of the main capacitor 19 and the ground. The drain and source nodes of the N-channel transistor 43 are connected between the input node ND1 of the inverter 20 and the ground.

A power-save signal PS controls the N-channel transistors 41, 42 and 43 to enter a turned-on or turned-off state.

Figure 15:
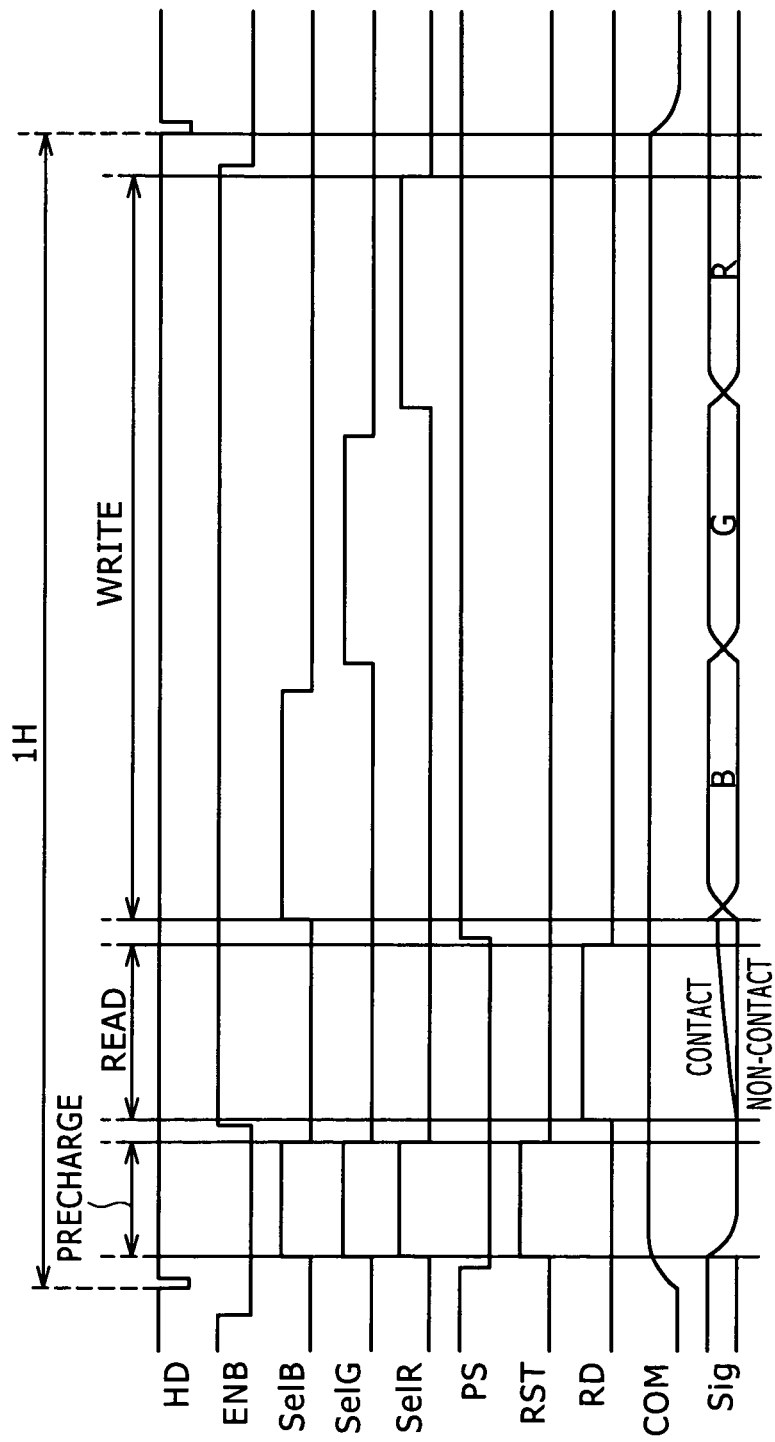
FIG. 15 is a timing diagram showing timing charts of operations carried out by the chopper-type comparator shown in the circuit diagrams of FIGS. 14A to 14C.
Figure 16:
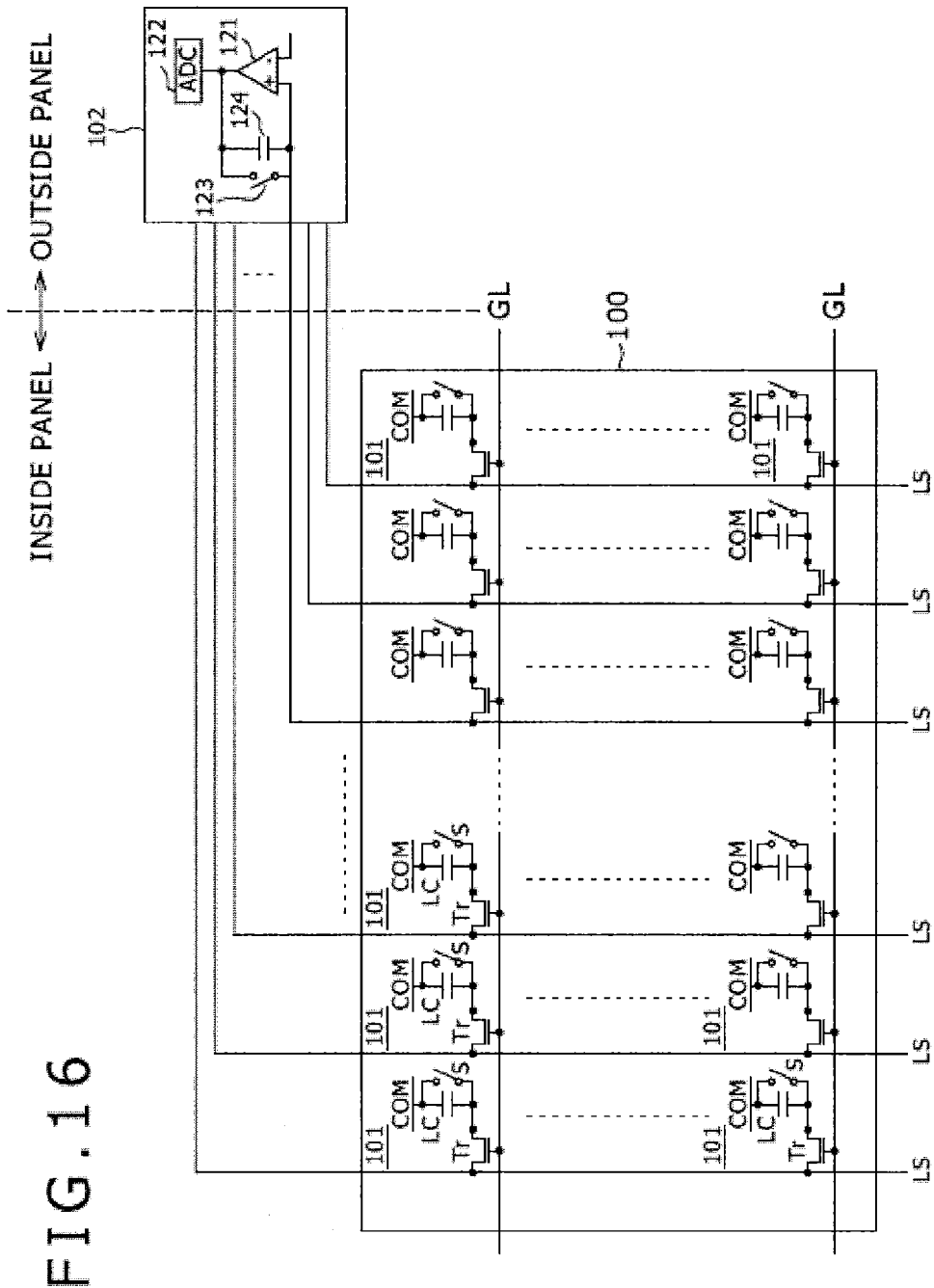
FIG. 16 is an explanatory circuit diagram showing a typical configuration of the related art liquid-crystal display panel.

FIG. 15 is a timing diagram showing timing charts of operations carried out by the chopper-type comparator 10 shown in the circuit diagrams of FIGS. 14A to 14C. During a precharge period, the reset signal RST is sustained at the H level which keeps the switches 12, 18 and 14 in a turned-on state. During this precharge period and a read period immediately lagging behind the precharge period, the power-save signal PS is sustained at the L level in order to keep the N-channel transistors 41, 42 and 43 in a turned-off state. Thus, the nodes ND1, ND2 and ND3 cited above are in a state of being disconnected from the ground. This state in the precharging period is shown in the circuit diagram of FIG. 14B. The state shown in the circuit diagram of FIG. 14B is a reset state which is equivalent to the reset state shown in the circuit diagram of FIG. 6A.

The precharge period of the reset state is followed by the aforementioned read period which is started when the reset signal RST is changed from the H level to the L level in order to put the switches 12, 18 and 14 in a turned-off state. Then, the sensor read signal RD is changed from the L level to the H level in order to put the switches 11 and 17 in a turned-on state. In the read period, the power-save signal PS remains at the L level as it is, sustaining the N-channel transistors 41, 42 and 43 in a turned-off state. Thus, the nodes ND1, ND2 and ND3 cited above are in a state of being disconnected from the ground. This state in the read period is shown in the circuit diagram of FIG. 14C. The state shown in the circuit diagram of FIG. 14C is a comparison state which is equivalent to the comparison state shown in the circuit diagram of FIG. 6B. That is to say, the precharge and read operations carried out during the precharge and read periods respectively are entirely the same as the precharge and read operations carried out by the chopper-type comparator 10 shown in the circuit diagrams of FIGS. 6A and 6B.

During periods other than the precharge and read periods, all the switches 11, 12, 14, 17 and 18 are sustained in a turned-off state. In the case of the chopper-type comparator 10 shown in the circuit diagrams of FIGS. 14A to 14C, in a period other than the precharge and read periods, the power-save signal PS is sustained at the H level in order to connect the nodes ND1, ND2 and ND3 to the ground and establish the power-save mode cited above. An example of the period other than the precharge and read periods is a write period shown in the timing diagram of FIG. 15 as a power-save period allocated to the aforementioned power-save mode in the power-save state shown in the circuit diagram of FIG. 14A.

In the reset state of the chopper-type comparator 10, the switch 14 is sustained in a turned-on state as shown in the circuit diagram of FIG. 14B, setting the input node ND1 of the inverter 20 at the threshold voltage of the inverter 20. In this reset state, a penetration current is flowing between the power supply and the ground. In addition, in the comparison state shown in FIG. 14C as a state of the chopper-type comparator 10, the level of the sensor signal Sig is close to the intermediate level between the levels of the power supply and the ground. With the sensor signal Sig having a level close to the intermediate level between the levels of the power supply and the ground, the penetration current is flowing to the inverter 20. Thus, the length of each of the precharge period allocated to the reset stage and the read period allocated the comparison state is reduced to a required minimum and, in addition, in periods other than the precharge and read periods, the magnitude of the penetration current of the inverter 20 is also decreased.

That is to say, in the write period outside the precharge and read periods, the chopper-type comparator 10 is sustained in a power-save state in which the power-save signal PS is kept at the H level, the reset signal RST is sustained at the L level and the sensor read signal RD is also kept at the L level. As described above, all the switches 11, 12, 14, 17 and 18 are sustained in a turned-off state in the power-save state. In the power-save state, the power-save signal PS is sustained at the H level in order to keep the transistors 41, 42 and 43 in a turned-on state so as to fix the nodes ND1, ND2 and ND3, which would otherwise be put in a floating state, to the L level. In this way, the power consumption of the chopper-type comparator 10 can be reduced to zero.

That is to say, as the comparison process carried out in the comparison state is ended, the power-save signal PS is changed from the L level to the H level, driving the inverter 20 to enter a power-save state which continues to the next cycle. In the power-save state, the power consumption of the chopper-type comparator 10 is cut.

As described above, in a time band other than the precharge and read periods, all the switches 11, 12, 14, 17 and 18 employed in the chopper-type comparator 10 are sustained in a turned-off state. In addition, the chopper-type comparator 10 also has means for pulling up or down the nodes ND1, ND2 and ND3, which would otherwise be put in a floating state, in the power-save state. Thus, the power consumption of the chopper-type comparator 10 can be reduced to a minimum in the power-save state.

[b 7. Effects of the Embodiment]

The embodiment described above exhibits the following effects:

The configuration of the chopper-type comparator 10 shown in the diagrams of FIGS. 6A and 6B or 14A to 14C includes a main capacitor 19 with a specific node thereof selectively receiving the sensor signal Sig which is the sensor signal or a the inverted COM-electrode electric potential xCOM serving a first reset electric potential. The configuration of the chopper-type comparator 10 shown in the diagrams of FIGS. 6A and 6B or 14A to 14C also includes an auxiliary capacitor 13 with a specific node thereof selectively receiving the sensor signal Sig or a the COM-electrode electric potential COM serving a second reset electric potential which is different from the first reset electric potential. Typically, the inverted COM-electrode electric potential xCOM is the inverted electric potential of the COM-electrode electric potential COM. The other node of the main capacitor 19 is connected to the other node of the auxiliary capacitor 13. In addition, the capacitance of the main capacitor 19 is different from the capacitance of the auxiliary capacitor 13. The other node of the main capacitor 19 and the other node of the auxiliary capacitor 13 are connected to each other to serve as the input node of the inverter 20. The switch 14 is used for connecting the input node of the inverter 20 to the output node of the inverter 20 or disconnecting the input node of the inverter 20 from the output node of the inverter 20.

With the configuration described above, the threshold voltage of the chopper-type comparator can be shifted in accordance with the ratio of the capacitance of the main capacitor 19 to the capacitance of the auxiliary capacitor 13 and the amplitude of the precharge level so that a proper insensitive zone of the chopper-type comparator 10 can be provided. As a result, it is possible to implement the high-speed response for the contact state of the pressure sensor S and the stable operation for the non-contact state of the pressure sensor S.

In addition, the COM-electrode electric potential COM and the inverted COM-electrode electric potential xCOM are taken as the preset levels of the two capacitors, which are the main capacitor 13 and the auxiliary capacitor 19 respectively. Thus, the insensitive zone of the chopper-type comparator 10 can be adjusted by changing the amplitude of the COM-electrode electric potential COM. That is to say, the larger the amplitude of the COM-electrode electric potential COM, the wider the insensitive zone of the chopper-type comparator 10. The noise level can also be changed by adjusting the amplitude of the COM-electrode electric potential COM. As described before, the noise level is defined as a level that must be recognized as a non-contact state. That is to say, the larger the amplitude of the COM-electrode electric potential COM, the higher the noise level. Thus, the shift quantity of the threshold voltage of the inverter 20 is adjusted automatically in accordance with noise magnitude changes which are attributed to variations in COM amplitude.

In accordance with the typical configuration shown in the circuit diagrams of FIGS. 14A to 14C and the operations carried out in the configuration, in a time band other than the precharge period allocated to the reset state and the read period allocated to the comparison state, all the switches 11, 12, 14, 17 and 18 employed in the chopper-type comparator 10 are sustained in a turned-off state. In addition, the chopper-type comparator 10 also has means for pulling up or down the nodes ND1, ND2 and ND3, which would otherwise be put in a floating state. Thus, the power consumption of the chopper-type comparator 10 can be reduced to a minimum in the power-save state.

In addition, the configuration of the liquid-crystal display panel shown in the diagram of FIG. 9 adopts a write system based on the selector method in order to reduce the number of signal lines connecting the liquid-crystal display panel to the external IC 90 and, at the same time, it is possible to minimize the number of lines which are used for transferring information read out from the sensors S employed in the pixel circuits 2.

In particular, by constructing the liquid-crystal display panel from low-temperature polysilicon TFTs, it is possible to transfer sensor information from pixel circuits 2 to the shift register serving as the parallel-serial conversion section 31 within a period of several microseconds before the operation to write B, G and R signal values into the pixel circuits 2. As a result, during the operation to write the next B, G and R signal values, the sensor information can be converted into a serial output.

In the typical configuration shown in the diagram of FIG. 12, pressure sensors S are provided in pixel circuits 2 every other column and every other row. In addition, two read circuits, i.e., the even-number read circuit 30e and the odd-number read circuit 30o, are provided for even-numbered columns and odd-numbered columns respectively. An operation to supply sensor information to the even-number read circuit 30e from pixel circuits 2 provided on the even-numbered columns is carried out alternately with an operation to supply sensor information to the odd-number read circuit 30o from pixel circuit 2 on the odd-numbered columns. While the operation to supply sensor information to the even-number read circuit 30e from pixel circuits 2 provided on the even-numbered columns is being carried out in a particular horizontal period, sensor information already supplied to the odd-number read circuit 30o from pixel circuit 2 on the odd-numbered columns is converted into serial data to be transferred to the external IC 90. Then, while the operation to supply sensor information to the odd-number read circuit 30o from pixel circuits 2 provided on the odd-numbered columns is being carried out in a horizontal period immediately lagging behind the particular horizontal period, sensor information already supplied to the even-number read circuit 30e from pixel circuit 2 on the even-numbered columns in the particular horizontal period is converted into serial data to be transferred to the external IC 90. It is thus possible to lower the frequency at which serial data is generated and transferred to the external IC 90. As a result, a more stable operation to generate serial data and transfer the data to the external IC 90 can be carried out.

It is to be noted that implementations of the present invention are by no means limited to the embodiment described above. In other words, it is needless to say that a variety of circuit configurations each serving as a modified version of the embodiment are conceivable.

The present application contains subject matter related to that disclosed in Japanese Priority Patent Application JP 2008-269747 filed in the Japan Patent Office on Oct. 20, 2008, the entire content of which is hereby incorporated by reference.

It should be understood by those skilled in the art that a variety of modifications, combinations, sub-combinations and alterations may occur, depending on design requirements and other factors as far as they are within the scope of the appended claims or the equivalents thereof.

What is claimed is:
1. A liquid-crystal display panel comprising:
gate lines each serving as a row-direction line which is one of the rows of a two-dimensional matrix;
data signal lines each serving as a column-direction line which is one of the columns of said two-dimensional matrix;
a plurality of liquid-crystal pixel sections which are laid out to form said two-dimensional matrix and each placed at the intersection of one of said gate lines and one of said data signal lines;
chopper-type comparators each connected to one of said data signal lines and each used for converting the value of a sensor signal read out from one of said liquid-crystal pixel sections connected to said data signal lines into a binary value; and a shift register for converting outputs of said chopper-type comparators from parallel data into serial data and outputting said serial data, wherein each individual one of said liquid-crystal pixel sections contains a liquid crystal provided between a pixel electrode and a facing electrode facing said pixel electrode, each individual liquid-crystal pixel section includes a pressure sensor for sensing an applied pressure by detecting whether said pixel electrode and said facing electrode are in a state of being brought into contact or non-contact with each other, and during a period in which said pixel electrode is in a state of being connected to said data signal line connected to said individual liquid-crystal pixel section by a control signal asserted on said gate line connected to said individual liquid-crystal pixel section, a liquid-crystal driving signal is supplied to said individual liquid-crystal pixel section through said data signal line, or said sensor signal indicating whether said pixel electrode and said facing electrode are in a state of being brought into contact or non-contact with each other is read out from said individual liquid-crystal pixel section through said data signal line connected to said individual liquid-crystal pixel section;

wherein said chopper-type comparator includes:

a first capacitor with a specific node thereof selectively receiving said sensor signal or a first reset electric potential;

a second capacitor with a specific node thereof selectively receiving said sensor signal or a second reset electric potential different from said first reset electric potential, the other node thereof connected to the other node of said first capacitor and the capacitance thereof different from the capacitance of said first capacitor;

an inverter with the input thereof connected to said other nodes of said first and second capacitors; and a switch device for connecting said input of said inverter to the output of said inverter or disconnecting said input of said inverter from said output of said inverter, and wherein said first reset electric potential is an electric potential having a phase opposite to the phase of an electric potential appearing at said facing electrode whereas said second reset electric potential is said electric potential appearing at said facing electrode.

2. The liquid-crystal display panel according to claim 1 wherein:

when said chopper-type comparator is operating in a reset state, said switch device connects said input of said inverter to said output of said inverter, said first reset electric potential, which is an electric potential having a phase opposite to said phase of said electric potential appearing at said facing electrode, is supplied to said specific node of said first capacitor and said second reset electric potential, which is said electric potential appearing at said facing electrode, is supplied to said specific node of said second capacitor; and when said chopper-type comparator is operating in a comparison state, on the other hand, said switch device disconnects said input of said inverter from said output of said inverter and said sensor signal is supplied to said specific node of said first capacitor as well as said specific node of said second capacitor so that said chopper-type comparator outputs digital data having a binary value of said sensor signal to serve as the output of said inverter.

3. A liquid-crystal display panel comprising:

gate lines each serving as a row-direction line which is one of the rows of a two-dimensional matrix;

data signal lines each serving as a column-direction line which is one of the columns of said two-dimensional matrix;

a plurality of liquid-crystal pixel sections which are laid out to form said two-dimensional matrix and each placed at the intersection of one of said gate lines and one of said data signal lines;

chopper-type comparators each connected to one of said data signal lines and each used for convertin the value of a sensor si al read out from one of said liquid-crystal pixel sections connected to said data signal lines into a binary value; and a shift register for converting outputs of said chopper-type comparators from parallel data into serial data and outputting said serial data, wherein each individual one of said liquid-crystal pixel sections contains a liquid crystal provided between a pixel electrode and a facing electrode facing said pixel electrode, each individual liquid-crystal pixel section includes a pressure sensor for sensing an applied pressure by detecting whether said pixel electrode and said facing electrode are in a state of being brought into contact or non-contact with each other, and during a period in which said pixel electrode is in a state of being connected to said data signal line connected to said individual liquid-crystal pixel section by a control signal asserted on said gate line connected to said individual liquid-crystal pixel section, a liquid-crystal driving signal is supplied to said individual liquid-crystal pixel section through said data signal line, or said sensor signal indicating whether said pixel electrode and said facing electrode are in a state of being brought into contact or non-contact with each other is read out from said individual liquid-crystal pixel section through said data signal line connected to said individual liquid-crystal pixel section;

wherein said chopper-type comparator includes:

a first capacitor with a specific node thereof selectively receiving said sensor signal or a first reset electric potential;

a second capacitor with a specific node thereof selectively receiving said sensor signal or a second reset electric potential different from said first reset electric potential, the other node thereof connected to the other node of said first capacitor and the capacitance thereof different from the capacitance of said first capacitor;

an inverter with the input thereof connected to said other nodes of said first and second capacitors; and a switch device for connecting said input of said inverter to the output of said inverter or disconnecting said input of said inverter from said output of said inverter, and wherein said chopper-type comparator has a configuration in which, when said chopper-type comparator is in a power-save state, each of said specific node of said first capacitor, said specific node of said second capacitor and said other nodes of said first and second capacitors is put in floating state before being pulled down or pulled up.

4. A liquid-crystal display panel comprising:

gate lines each serving as a row-direction line which is one of the rows of a two-dimensional matrix;

data signal lines each serving as a column-direction line which is one of the columns of said two-dimensional matrix;

a plurality of liquid-crystal pixel sections which are laid out to form said two-dimensional matrix and each placed at the intersection of one of said gate lines and one of said data signal lines;

chopper-type comparators each connected to one of said data signal lines and each used for converting the value of a sensor signal read out from one of said liquid-crystal pixel sections connected to said data signal lines into a binary value; and a shift register for converting outputs of said chopper-type comparators from parallel data into serial data and outputting said serial data, wherein each individual one of said liquid-crystal pixel sections contains a liquid crystal provided between a pixel electrode and a facing electrode facing said pixel electrode, each individual liquid-crystal pixel section includes a pressure sensor for sensing an applied pressure by detecting whether said pixel electrode and said facing electrode are in a state of being brought into contact or non-contact with each other, and during a period in which said pixel electrode is in a state of being connected to said data signal line connected to said individual liquid-crystal pixel section by a control signal asserted on said gate line connected to said individual liquid-crystal pixel section, a liquid-crystal driving signal is supplied to said individual liquid-crystal pixel section through said data signal line or said sensor signal indicating whether said pixel electrode and said facing electrode are in a state of being brought into contact or non-contact with each other is read out from said individual liquid-crystal pixel section through said data signal line connected to said individual liquid-crystal pixel section;

wherein said chopper-type comparator includes:

a first capacitor with a specific node thereof selectively receiving said sensor signal or a first reset electric potential;

a second capacitor with a specific node thereof selectively receiving said sensor signal or a second reset electric potential different from said first reset electric potential, the other node thereof connected to the other node of said first capacitor and the capacitance thereof different from the capacitance of said first capacitor;

an inverter with the input thereof connected to said other nodes of said first and second capacitors; and a switch device for connecting said input of said inverter to the output of said inverter or disconnecting said input of said inverter from said output of said inverter, and wherein:

when said chopper-type comparator is operating in a reset state, said switch device connects said input of said inverter to said output of said inverter, said first reset electric potential, which is an electric potential having a phase opposite to said phase of said electric potential appearing at said facing electrode, is supplied to said specific node of said first capacitor and said second reset electric potential, which is said electric potential appearing at said facing electrode, is supplied to said specific node of said second capacitor.

5. A liquid-crystal display panel comprising:

gate lines each serving as a row-direction line which is one of the rows of a two-dimensional matrix;

data signal lines each serving as a column-direction line which is one of the columns of said two-dimensional matrix;

a plurality of liquid-crystal pixel sections which are laid out to form said two-dimensional matrix and each placed at the intersection of one of said gate lines and one of said data signal lines;

chopper-type comparators each connected to one of said data signal lines and each used for converting the value of a sensor signal read out from one of said liquid-crystal pixel sections connected to said data signal lines into a binary value; and a shift register for converting outputs of said chopper-type comparators from parallel data into serial data and outputting said serial data, wherein each individual one of said liquid-crystal pixel sections contains a liquid crystal provided between a pixel electrode and a facing electrode facing said pixel electrode, each individual liquid-crystal pixel section includes a pressure sensor for sensing an applied pressure by detecting whether said pixel electrode and said facing electrode are in a state of being brought into contact or non-contact with each other, and during a period in which said pixel electrode is in a state of being connected to said data signal line connected to said individual liquid-crystal pixel section by a control signal asserted on said gate line connected to said individual liquid-crystal pixel section, a liquid-crystal driving signal is supplied to said individual liquid-crystal pixel section through said data signal line, or said sensor signal indicating whether said pixel electrode and said facing electrode are in a state of being brought into contact or non-contact with each other is read out from said individual liquid-crystal pixel section through said data signal line connected to said individual liquid-crystal pixel section;

wherein said chopper-type comparator includes:

a first capacitor with a specific node thereof selectively receiving said sensor signal or a first reset electric potential;

a second capacitor with a specific node thereof selectively receiving said sensor signal or a second reset electric potential different from said first reset electric potential, the other node thereof connected to the other node of said first capacitor and the capacitance thereof different from the capacitance of said first capacitor;

an inverter with the input thereof connected to said other nodes of said first and second capacitors; and a switch device for connecting said input of said inverter to the output of said inverter or disconnecting said input of said inverter from said output of said inverter, and wherein:

when said chopper-type comparator is operating in a comparison state, on the other hand, said switch device disconnects said input of said inverter from said output of said inverter and said sensor signal is supplied to said specific node of said first capacitor as well as said specific node of said second capacitor so that said chopper-type comparator outputs digital data having a binary value of said sensor signal to serve as the output of said inverter.

6. A chopper-type comparator comprising:

a first capacitor with a specific node thereof selectively receiving an input signal or a first reset electric potential;

a second capacitor with a specific node thereof selectively receiving said input signal or a second reset electric potential different from said first reset electric potential, the other node thereof connected to the other node of said first capacitor and the capacitance thereof different from the capacitance of said first capacitor;

an inverter with the input thereof connected to said other nodes of said first and second capacitors; and a switch device for connecting said input of said inverter to the output of said inverter or disconnecting said input of said inverter from said output of said inverter, wherein:

when said chopper-type comparator is operating in a reset state, said switch device connects said input of said inverter to said output of said inverter, said first reset electric potential is supplied to said specific node of said first capacitor and said second reset electric potential is supplied to said specific node of said second capacitor; and when said chopper-type comparator is operating in a comparison state, on the other hand, said switch device disconnects said input of said inverter from said output of said inverter and said input signal is supplied to said specific node of said first capacitor as well as said specific node of said second capacitor so that said chopper-type comparator outputs digital data having a binary value of said input signal to serve as the output of said inverter.

7. The chopper-type comparator according to claim 6, wherein:
the second reset electric potential has a phase opposite to the phase of said first reset electric potential.

8. A chopper-type comparator comprising:
a first capacitor with a specific node thereof selectively receiving an input signal or a first reset electric potential;
a second capacitor with a specific node thereof selectively receiving said input signal or a second reset electric potential different from said first reset electric potential the other node thereof connected to the other node of said first capacitor and the capacitance thereof different from the capacitance of said first capacitor;
an inverter with the input thereof connected to said other nodes of said first and second capacitors; and
a switch device for connecting said input of said inverter to the output of said inverter or disconnecting said input of said inverter from said output of said inverter, wherein:
the second reset electric potential has a phase opposite to the phase of said first reset electric potential.

9. A chopper-type comparator comprising:
a first capacitor with a specific node thereof selectively receiving an input signal or a first reset electric potential;
a second capacitor with a specific node thereof selectively receiving said input signal or a second reset electric potential different from said first reset electric potential, the other node thereof connected to the other node of said first capacitor and the capacitance thereof different from the capacitance of said first capacitor;
an inverter with the input thereof connected to said other nodes of said first and second capacitors; and
a switch device for connecting said input of said inverter to the output of said inverter or disconnecting said input of said inverter from said output of said inverter, wherein:
when said chopper-type comparator is operating in a reset state, said switch device connects said input of said inverter to said output of said inverter, said first reset electric potential is supplied to said specific node of said first capacitor and said second reset electric potential is supplied to said specific node of said second capacitor.

10. A chopper-type comparator comprising:
a first capacitor with a specific node thereof selectively receiving an input signal or a first reset electric potential;
a second capacitor with a specific node thereof selectively receiving said input signal or a second reset electric potential different from said first reset electric potential, the other node thereof connected to the other node of said first capacitor and the capacitance thereof different from the capacitance of said first capacitor;
an inverter with the input thereof connected to said other nodes of said first and second capacitors; and
a switch device for connecting said input of said inverter to the output of said inverter or disconnecting said input of said inverter from said output of said inverter, wherein:
when said chopper-type comparator is operating in a comparison state, on the other hand, said switch device disconnects said input of said inverter from said output of said inverter and said input signal is supplied to said specific node of said first capacitor as well as said specific node of said second capacitor so that said chopper-type comparator outputs digital data having a binary value of said input signal to serve as the output of said inverter.

11. A display device comprising:
a touch sensor within a liquid-crystal display panel, the liquid-crystal panel including gate lines each serving as a row-direction line which is one of the rows of a two-dimensional matrix,
data signal lines each serving as a column-direction line which is one of the columns of the two-dimensional matrix, and
a plurality of liquid-crystal pixel sections laid out to form the two-dimensional matrix, each liquid-crystal pixel section being placed at an intersection of one of the gate lines and one of the data signal lines, each of the liquid-crystal pixel sections containing a liquid crystal provided between a pixel electrode and a facing electrode facing the pixel electrode,
and the touch sensor including
a pressure sensor provided at each individual liquid-crystal pixel section, each pressure sensor being configured to sense an applied pressure by detecting whether the pixel electrode and the facing electrode are in a state of being brought into contact or non-contact with each other,
chopper-type comparators each connected to one of the data signal lines and each used for converting the value of a sensor signal read out from one of the liquid-crystal pixel sections connected to the data signal lines into a binary value, and
a shift register for converting outputs of the chopper-type comparators from parallel data into serial data and outputting the serial data, wherein
during a period in which the pixel electrode is in a state of being connected to the data signal line connected to the individual liquid-crystal pixel section by a control signal asserted on the gate line connected to the individual liquid-crystal pixel section, a liquid-crystal driving signal is supplied to the individual liquid-crystal pixel section through the data signal line, or the sensor signal indicating whether the pixel electrode and the facing electrode are in a state of being brought into contact or non-contact with each other is read out from the individual liquid-crystal pixel section through the data signal line connected to the individual liquid-crystal pixel section, and
conversion of values of each of the sensor signals read out from each of the liquid-crystal pixel sections connected to the data signal lines into the binary value is carried out inside the liquid-crystal display panel, wherein conversion of outputs of each of the chopper-type comparators from parallel data into serial data and outputting the serial data is carried out inside the liquid-crystal display panel, wherein the chopper-type comparator includes:

a first capacitor with a specific node thereof selectively receiving the sensor signal or a first reset electric potential;

a second capacitor with a specific node thereof selectively receiving the sensor signal or a second reset electric potential different from the first reset electric potential, the other node thereof connected to the other node of the first capacitor and the capacitance thereof different from the capacitance of the first capacitor;

an inverter with the input thereof connected to the other nodes of the first and second capacitors; and a switch device for connecting the input of the inverter to the output of the inverter or disconnecting the input of the inverter from the output of the inverter, and wherein the first reset electric potential is an electric potential having a phase opposite to the phase of an electric potential appearing at the facing electrode whereas the second reset electric potential is the electric potential appearing at the facing electrode.

12. A display device comprising:

a touch sensor within a liquid-crystal display panel, the liquid-crystal panel including gate lines each serving as a row-direction line which is one of the rows of a two-dimensional matrix, data signal lines each serving as a column-direction line which is one of the columns of the two-dimensional matrix, and a plurality of liquid-crystal pixel sections laid out to form the two-dimensional matrix, each liquid-crystal pixel section being placed at an intersection of one of the gate lines and one of the data signal lines, each of the liquid-crystal pixel sections containing a liquid crystal provided between a pixel electrode and a facing electrode facing the pixel electrode, and the touch sensor including a pressure sensor provided at each individual liquid-crystal pixel section, each pressure sensor being configured to sense an applied pressure by detecting whether the pixel electrode and the facing electrode are in a state of being brought into contact or non-contact with each other, chopper-type comparators each connected to one of the data signal lines and each used for converting the value of a sensor signal read out from one of the liquid-crystal pixel sections connected to the data signal lines into a binary value, and a shift register for converting outputs of the chopper-type comparators from parallel data into serial data and outputting the serial data, wherein during a period in which the pixel electrode is in a state of being connected to the data signal line connected to the individual liquid-crystal pixel section by a control signal asserted on the gate line connected to the individual liquid-crystal pixel section, a liquid-crystal driving signal is supplied to the individual liquid-crystal pixel section through the data signal line, or the sensor signal indicating whether the pixel electrode and the facing electrode are in a state of being brought into contact or non-contact with each other is read out from the individual liquid-crystal pixel section through the data signal line connected to the individual liquid-crystal pixel section, and conversion of values of each of the sensor signals read out from each of the liquid-crystal pixel sections connected to the data signal lines into the binary value is carried out inside the liquid-crystal display panel, wherein conversion of outputs of each of the chopper-type comparators from parallel data into serial data and outputting the serial data is carried out inside the liquid-crystal display panel, wherein the chopper-type comparator includes:

a first capacitor with a specific node thereof selectively receiving the sensor signal or a first reset electric potential;

a second capacitor with a specific node thereof selectively receiving the sensor signal or a second reset electric potential different from the first reset electric potential, the other node thereof connected to the other node of the first capacitor and the capacitance thereof different from the capacitance of the first capacitor;

an inverter with the input thereof connected to the other nodes of the first and second capacitors; and a switch device for connecting the input of the inverter to the output of the inverter or disconnecting the input of the inverter from the output of the inverter, and wherein the chopper-type comparator has a configuration in which, when the chopper-type comparator is in a power-save state, each of the specific node of the first capacitor, the specific node of the second capacitor and the other nodes of the first and second capacitors is put in floating state before being pulled down or pulled up.

13. A display device comprising:

a touch sensor within a liquid-crystal display panel, the liquid-crystal panel including gate lines each serving as a row-direction line which is one of the rows of a two-dimensional matrix, data signal lines each serving as a column-direction line which is one of the columns of the two-dimensional matrix, and a plurality of liquid-crystal pixel sections laid out to form the two-dimensional matrix, each liquid-crystal pixel section being placed at an intersection of one of the gate lines and one of the data signal lines, each of the liquid-crystal pixel sections containing a liquid crystal provided between a pixel electrode and a facing electrode facing the pixel electrode, and the touch sensor including a pressure sensor provided at each individual liquid-crystal pixel section, each pressure sensor being configured to sense an applied pressure by detecting whether the pixel electrode and the facing electrode are in a state of being brought into contact or non-contact with each other, chopper-type comparators each connected to one of the data signal lines and each used for converting the value of a sensor signal read out from one of the liquid-crystal pixel sections connected to the data signal lines into a binary value, and a shift register for converting outputs of the chopper-type comparators from parallel data into serial data and outputting the serial data, wherein during a period in which the pixel electrode is in a state of being connected to the data signal line connected to the individual liquid-crystal pixel section by a control signal asserted on the gate line connected to the individual liquid-crystal pixel section, a liquid-crystal driving signal is supplied to the individual liquid-crystal pixel section through the data signal line, or the sensor signal indicating whether the pixel electrode and the facing electrode are in a state of being brought into contact or non-contact with each other is read out from the individual liquid-crystal pixel section through the data signal line connected to the individual liquid-crystal pixel section, and conversion of values of each of the sensor signals read out from each of the liquid-crystal pixel sections connected to the data signal lines into the binary value is carried out inside the liquid-crystal display panel, wherein conversion of outputs of each of the chopper-type comparators from parallel data into serial data and outputting the serial data is carried out inside the liquid-crystal display panel, wherein the chopper-type comparator includes:

a first capacitor with a specific node thereof selectively receiving the sensor signal or a first reset electric potential;

a second capacitor with a specific node thereof selectively receiving the sensor signal or a second reset electric potential different from the first reset electric potential, the other node thereof connected to the other node of the first capacitor and the capacitance thereof different from the capacitance of the first capacitor;

an inverter with the input thereof connected to the other nodes of the first and second capacitors; and a switch device for connecting the input of the inverter to the output of the inverter or disconnecting the input of the inverter from the output of the inverter, and wherein:

when the chopper-type comparator is operating in a reset state, the switch device connects the input of the inverter to the output of the inverter, the first reset electric potential, which is an electric potential having a phase opposite to the phase of the electric potential appearing at the facing electrode, is supplied to the specific node of the first capacitor and the second reset electric potential, which is the electric potential appearing at the facing electrode, is supplied to the specific node of the second capacitor.

14. A display device comprising:

a touch sensor within a liquid-crystal display panel, the liquid-crystal panel including gate lines each serving as a row-direction line which is one of the rows of a two-dimensional matrix, data signal lines each serving as a column-direction line which is one of the columns of the two-dimensional matrix, and a plurality of liquid-crystal pixel sections laid out to form the two-dimensional matrix, each liquid-crystal pixel section being placed at an intersection of one of the gate lines and one of the data signal lines, each of the liquid-crystal pixel sections containing a liquid crystal provided between a pixel electrode and a facing electrode facing the pixel electrode, and the touch sensor including a pressure sensor provided at each individual liquid-crystal pixel section, each pressure sensor being configured to sense an applied pressure by detecting whether the pixel electrode and the facing electrode are in a state of being brought into contact or non-contact with each other, chopper-type comparators each connected to one of the data signal lines and each used for converting the value of a sensor signal read out from one of the liquid-crystal pixel sections connected to the data signal lines into a binary value, and a shift register for converting outputs of the chopper-type comparators from parallel data into serial data and outputting the serial data, wherein during a period in which the pixel electrode is in a state of being connected to the data signal line connected to the individual liquid-crystal pixel section by a control signal asserted on the gate line connected to the individual liquid-crystal pixel section, a liquid-crystal driving signal is supplied to the individual liquid-crystal pixel section through the data signal line, or the sensor signal indicating whether the pixel electrode and the facing electrode are in a state of being brought into contact or non-contact with each other is read out from the individual liquid-crystal pixel section through the data signal line connected to the individual liquid-crystal pixel section, and conversion of values of each of the sensor signals read out from each of the liquid-crystal pixel sections connected to the data signal lines into the binary value is carried out inside the liquid-crystal display panel, wherein conversion of outputs of each of the chopper-type comparators from parallel data into serial data and outputting the serial data is carried out inside the liquid-crystal display panel, wherein the chopper-type comparator includes:

a first capacitor with a specific node thereof selectively receiving the sensor signal or a first reset electric potential;

a second capacitor with a specific node thereof selectively receiving the sensor signal or a second reset electric potential different from the first reset electric potential, the other node thereof connected to the other node of the first capacitor and the capacitance thereof different from the capacitance of the first capacitor;

an inverter with the input thereof connected to the other nodes of the first and second capacitors; and a switch device for connecting the input of the inverter to the output of the inverter or disconnecting the input of the inverter from the output of the inverter, and wherein:

when the chopper-type comparator is operating in a comparison state, on the other hand, the switch device disconnects the input of the inverter from the output of the inverter and the sensor signal is supplied to the specific node of the first capacitor as well as the specific node of the second capacitor so that the chopper-type comparator outputs digital data having a binary value of the sensor signal to serve as the output of the inverter.

* * * * *